(12) United States Patent
Cabiran

(10) Patent No.: US 6,869,245 B2
(45) Date of Patent: Mar. 22, 2005

(54) HIGH STRENGTH DETACHABLE CYLINDER-TO-PLATE JOINT FOR TABLES, FURNITURE, AND OTHER STATIC STRUCTURES

(76) Inventor: Michel Lewis Cabiran, 4111 Placid Stream Ct., Houston, TX (US) 77059

( * ) Notice: Subject to any disclaimer, the term of this patent is extended or adjusted under 35 U.S.C. 154(b) by 0 days.

(21) Appl. No.: 09/970,350

(22) Filed: Oct. 3, 2001

(65) Prior Publication Data

US 2003/0063947 A1 Apr. 3, 2003

(51) Int. Cl.[7] .................................................. F16B 41/00
(52) U.S. Cl. ........................................ 403/188; 403/299
(58) Field of Search .............................. 403/187, 188, 403/299

(56) References Cited

U.S. PATENT DOCUMENTS

| | | |
|---|---|---|
| 252,378 A | 1/1882 | Hoover |
| 1,342,951 A | 6/1920 | Gagne |
| 1,762,766 A | 6/1930 | Gardner |
| 1,764,226 A | 6/1930 | Rennack |
| 1,877,098 A | 9/1932 | Washburn |
| 2,099,450 A | 2/1937 | Meyer |
| 2,312,185 A | 2/1943 | Neunherz |
| 2,607,648 A | 8/1952 | Metcalf |
| 2,827,318 A | 3/1958 | White |
| 4,199,124 A | 4/1980 | Tachida |
| 4,662,591 A | 5/1987 | Encontre |
| 4,735,390 A | 4/1988 | Richards |
| 4,779,294 A | 10/1988 | Miller |
| 5,588,624 A | 12/1996 | Woodham |
| 5,772,356 A * | 6/1998 | Collins ................... 403/299 X |
| 5,956,917 A * | 9/1999 | Reynolds ................ 403/299 X |
| 6,585,447 B2 * | 7/2003 | Schwarzbich .......... 403/299 X |

FOREIGN PATENT DOCUMENTS

| | | |
|---|---|---|
| AT | 34036 | 8/1908 |
| CH | 270914 | 5/1951 |
| DK | 50055 | 3/1935 |
| FR | 494930 | 6/1919 |
| FR | 802739 | 2/1936 |
| FR | 1345105 | 10/1962 |
| SE | 128750 | 6/1948 |

* cited by examiner

Primary Examiner—John R. Cottingham
(74) Attorney, Agent, or Firm—Andrew S. Pryzant

(57) ABSTRACT

Disclosed are high-strength detachable cylinder-to-plate joints for use in manufacturing tables, shelves, other types of furniture and support structures for machinery and articles of manufacture including shelves and furniture made using present invention joints. The joint comprises a disk with a threaded outside diameter attached to a plate by bolts or screws. A cylinder having an annular end with a threaded inside diameter is attached to the threaded disk to form a threaded connection therewith. The threaded cylinder can comprise a sleeve having a threaded end for attachment to the disk, and an opposite end for attaching an extension member that can have a non-cylindrical diameter (i.e. square table leg).

20 Claims, 40 Drawing Sheets

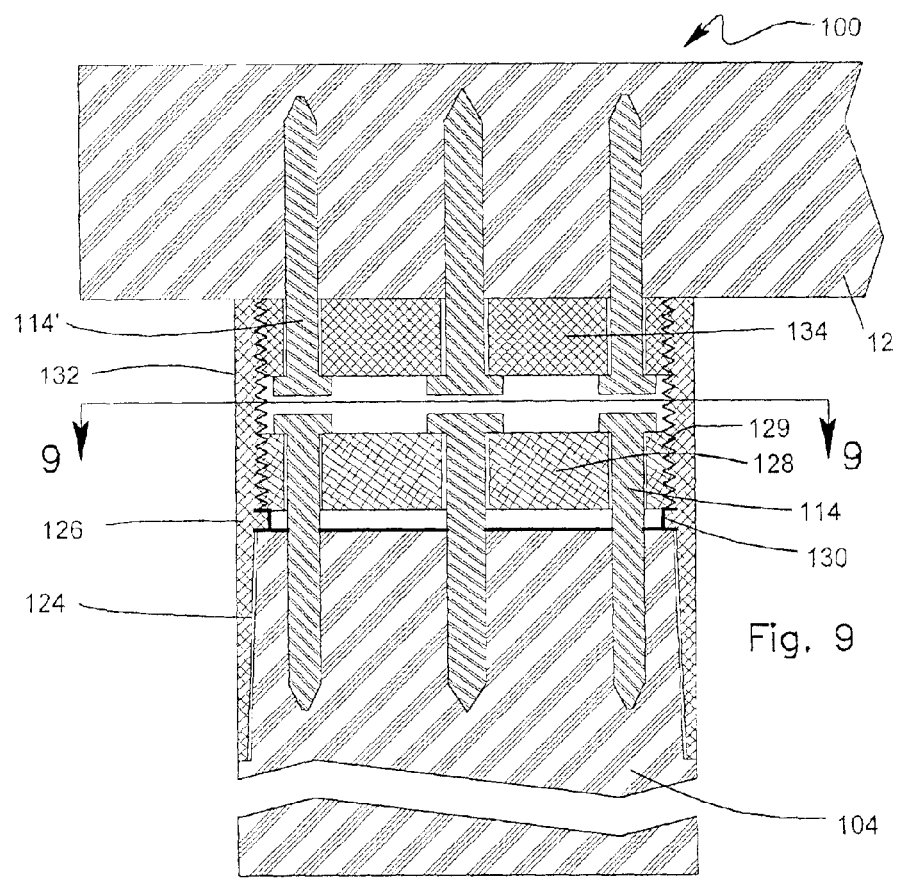
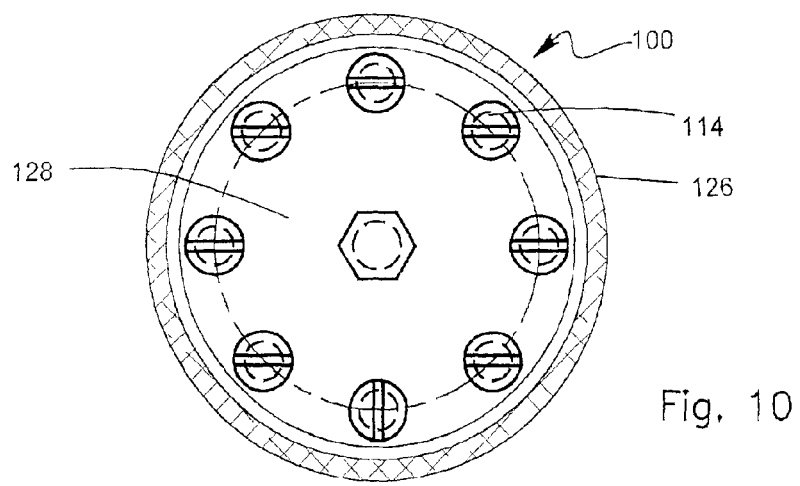

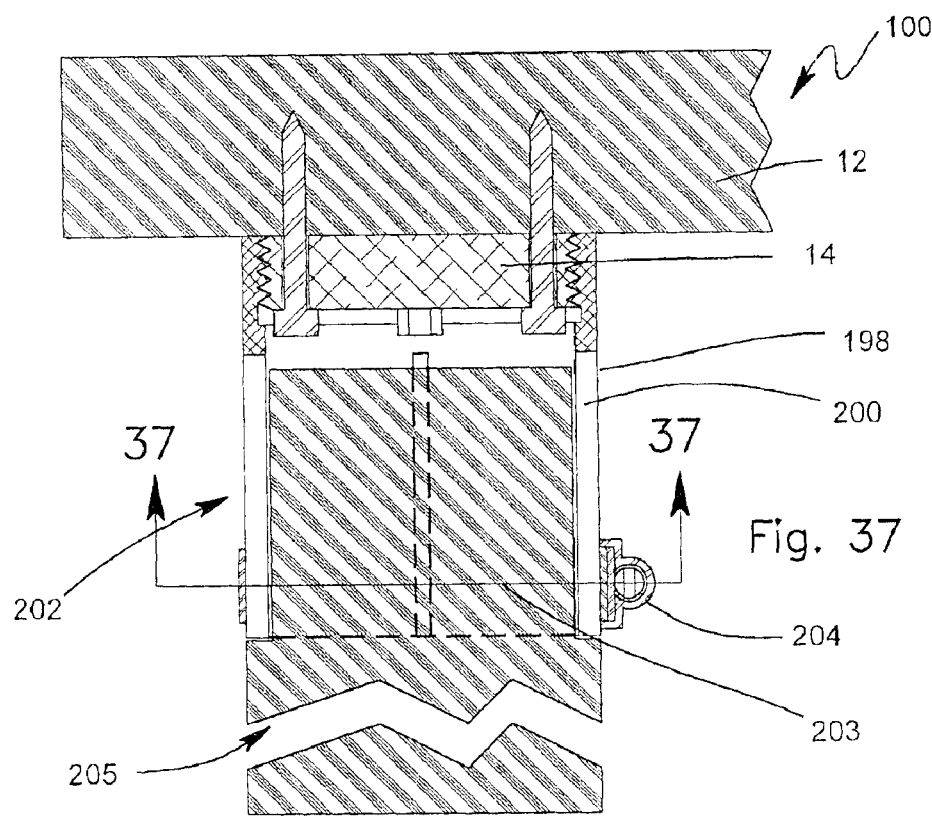
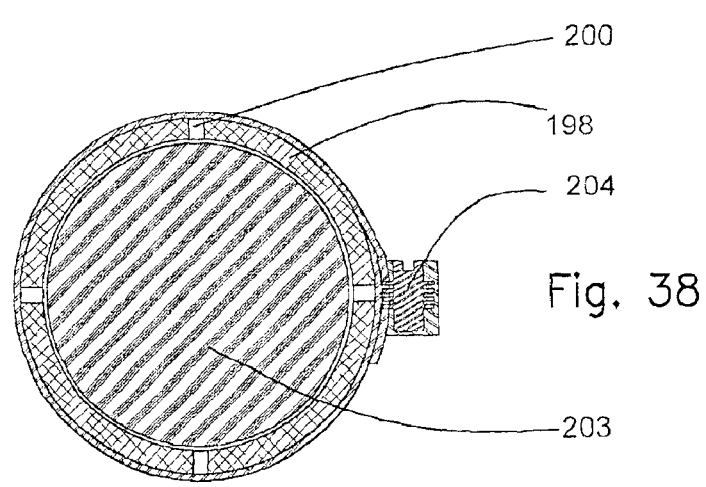

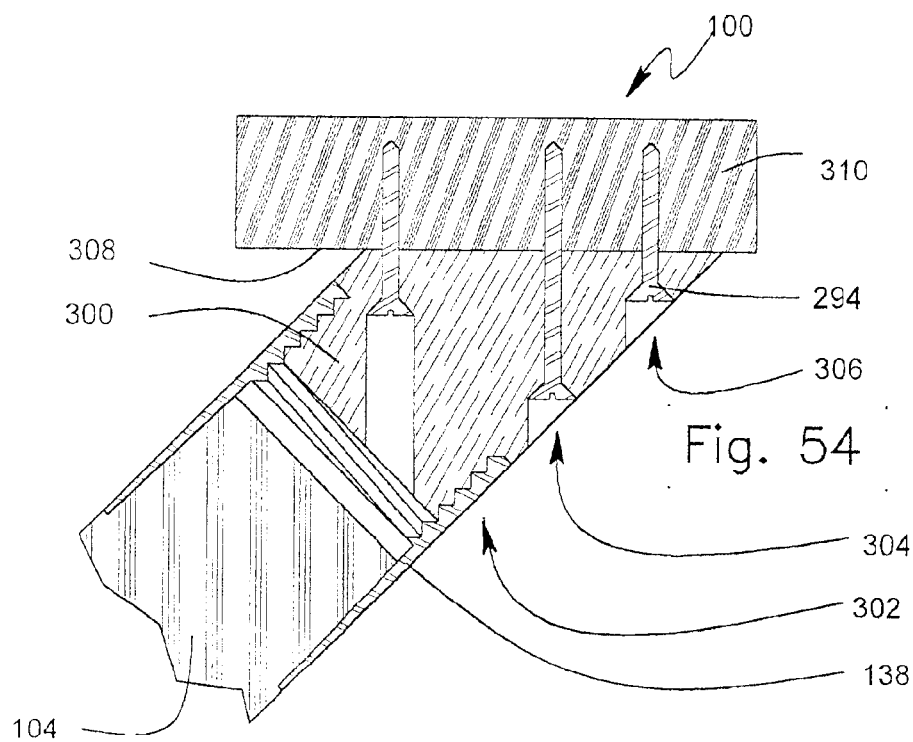
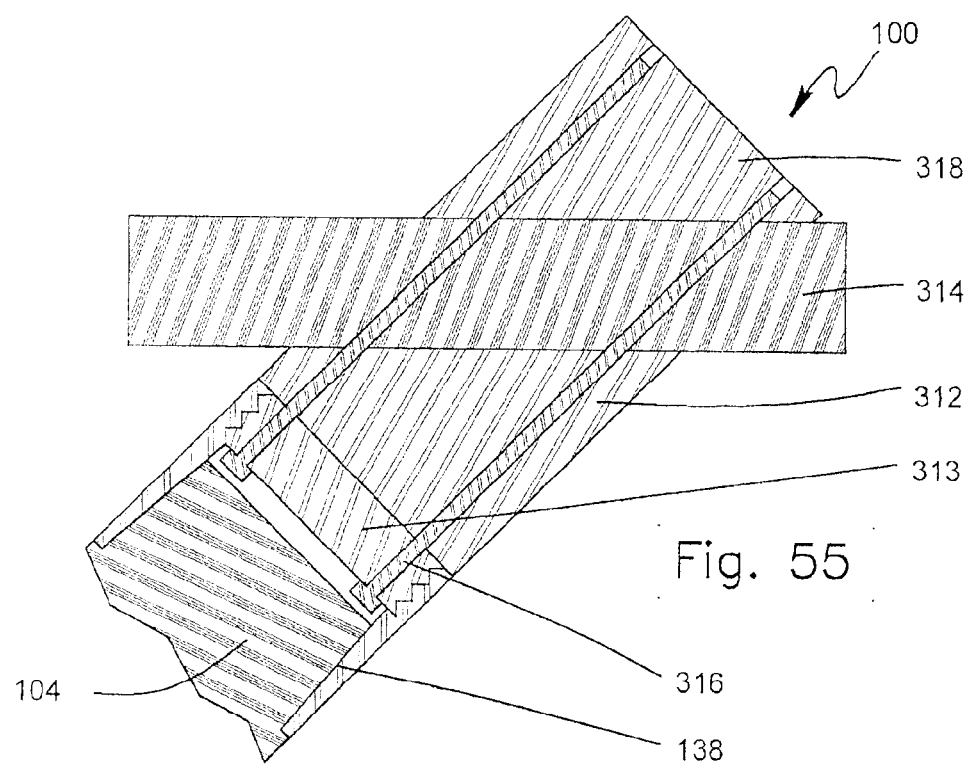

HIGH STRENGTH DETACHABLE CYLINDER-TO-PLATE JOINT FOR TABLES, FURNITURE, AND OTHER STATIC STRUCTURES

FIELD OF THE INVENTION

The present invention relates to a detachable joint between a plate and a cylinder to form a high strength connection, and more particularly, the present invention relates to items of furniture or support tables and a system for building furniture or support tables employing joints of the present invention.

BACKGROUND OF THE INVENTION

By way of background, geometry involved does not permit the joints between a cylinder and a plate that is both strong, detachable and free of multiplicity of brackets, bracing and other reinforcement devices in building furniture such as tables, chairs, shelves, etc. and support stands for machinery and the like. Bending moments associated with such joints (table, chairs and the like) are high. Further, such brackets and braces and their associated bolts and screws lack aesthetic appearance and can be cumbersome to use. While metal joints can be welded together, this obviates simple onsite setting-up and breaking down. Non-metal joints can be glued but such glued joints are a weak link in the table. Neither of the above joints is reversibly detachable.

Brackets with an integral central threaded connection for the leg and an exterior plate which screws to the table top (plate) are disclosed in several U.S. and foreign patent documents. See for example U.S. Pat. No. 1,342,951 to Gagne, U.S. Pat. No. 1,762,776 to Gardner, U.S. Pat. No. 1,764,226 to Rennick, U.S. Pat. No. 4,199,124 to Tachida and U.S. Pat. No. 4,662,591 to Encontre; and Swedish Patent 128,750.

U.S. Pat. No. 2,607,648 to Metcalf and U.S. Pat. No. 4,735,390 to Richards disclose joints utilizing a welded bracket to which the leg is attached typically as a threaded connection.

Often the leg has been screwed directly to the table (see U.S. Pat. No. 1,877,098) and stretchers or the like braces have been employed to improve strength where necessary as in U.S. Pat. No. 2,099,450 to Meyer. Alternatively, the bracket is formed as an integral feature of the joint in question and the connector is a threaded peg or dual threaded screw. See U.S. Pat. No. 2,827,318 to White; French Patents 1,345,105; 494,930; 802,739; Swiss Patent 270,914; Danish Patent 50,055; and Austrian Patent 34,036.

U.S. Pat. No. 2,312,185 to Neuherz discloses a ferrule connector. Other patents of interest include U.S. Pat. No. 252,378 to Hoover and U.S. Pat. No. 5,588,624 to Woodham.

Heretofore, the bending moment at the end of a long lever arm has not been supported by enhancing the diameter of the threaded connection of the joint in a fashion suitable to produce a strong detachable joint that is also simple and aesthetic in appeal.

SUMMARY OF THE INVENTION

The plate-to-cylinder joint of the present invention produces a strong yet detachable means to support the long lever arm formed thereby in the making of tables, chairs, shelves, support frames and the like furniture and articles of manufacture. By increasing the effective diameter of joint threaded connections, a novel joint free of support braces, stretchers, and the like stiffening elements can be simplified or the stiffening elements can be eliminated altogether.

As one embodiment, the present invention provides a high strength detachable cylinder-to-plate joint composed of a base plate, a connecting disk detachably attached thereto and a cylinder having an annular end that is attached to the connecting disk by a threaded connection so the surfaces of the cylinder and the base plate abut. The base plate can be a tabletop and the cylinder can comprise table legs. The cylinder can be attached to a connecting disk at both annular ends that in turn are attached to base plates. In such fashion various styles of furniture including chairs, tables, shelves and couches, etc. can be assembled.

As another embodiment of the present invention, the annular end comprises a sleeve with one end threadably attached to the connecting disk and a second end attached to the cylinder. The sleeve and cylinder can be attached by various means including threads, bolts and screws, compressed fit, taper, adhesive, welding, etc. In addition, the sleeve can have the same or variable exterior diameter, or have square or rectangular outside walls with a cylindrical hole and include one or more interior fitting such as, for example, an attachment disk, tapered walls, slotted walls, barbed walls, etc. for securing the cylinder to the sleeve. The cylinder can be a cylindrical end of an extended member having a non-cylinder cross-section such as a square-formed table leg.

BRIEF DESCRIPTION OF THE DRAWINGS

FIG. 7 shows a sectional view of the embodiment of FIG. 6 along the lines 6a—6a.

FIG. 9 shows a cross-sectional view of yet another embodiment of the joint assembly of the present invention including a sleeve and a pair of connecting disks.

FIG. 10 shows a sectional view of the joint of FIG. 9 as seen along the lines 9—9.

FIG. 37 shows a cross-sectional view of the joint in accordance with FIG. 33 wherein the sleeve is slotted and the leg is clamped therein.

FIG. 38 shows a cross-sectional view of the joint of FIG. 37 as seen along the lines 37—37.

FIG. 54 shows a cross-sectional view of a further embodiment of the joint of the present invention wherein the threaded disk has 45 degree angled extension for joining the plate and cylinder at an angle.

FIG. 55 shows a cross-sectional view of a variation of the angled joint of FIG. 54.

DETAILED DESCRIPTION OF THE PREFERRED EMBODIMENTS

A plate-to-cylinder joint in accordance with the present invention made using an exteriorly threaded disk attached to interiorly threaded sleeve or tube has advantages of ease of manufacture, enhanced strength and aesthetic appeal compared to the prior art. Firstly the present joint generally hides attachment screws and bolts for aesthetic appeal by placing them on the inside of the cylinder. Strength of the joint is maximized for a given joint cylinder diameter by establishing the threaded connection on the outer diameter of the disk.

Manufacture of furniture and equipment supports using the present joint can be made in place due to detachability. Machining steps of the manufacture of the various sleeves and tubes associated with the present joint are minimized and the strength per wall thickness is greater in the practice of the present invention. The present joint can be used to manufacture tables, chairs, shelve systems, support structures for all purposes (commercial and industrial), and from many materials both wood and metal or in combinations thereof. The concept of the present invention joint can be applied to other types of joints such as cylinder-to-cylinder joints both axial (butt-end connection) and in transverse orientation for a variety of purposes.

Figure 1:
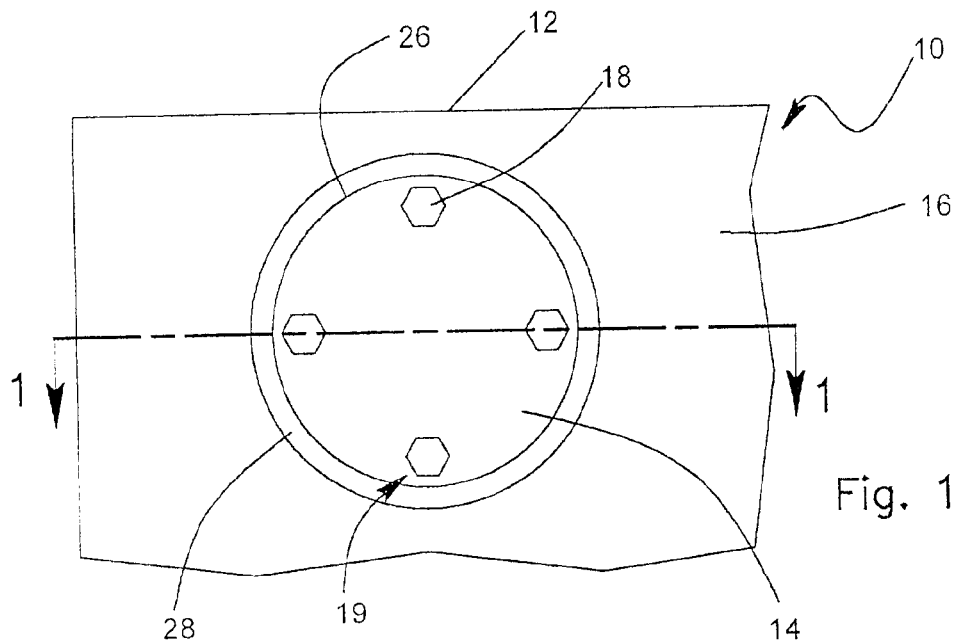
FIG. 1 shows a bottom view of one embodiment of a plate-to-cylinder joint assembly of the present invention.
Figure 2:
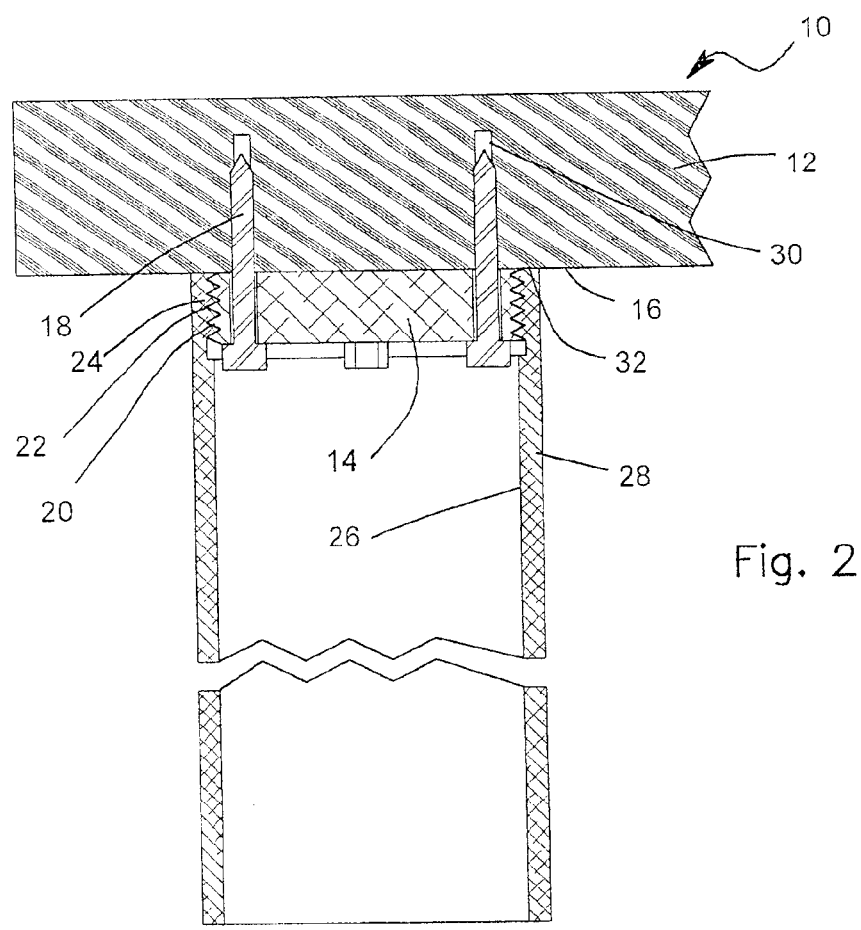
FIG. 2 shows a cross-sectional view of the embodiment of FIG. 1 as seen along the lines 1—1.
Figure 3:
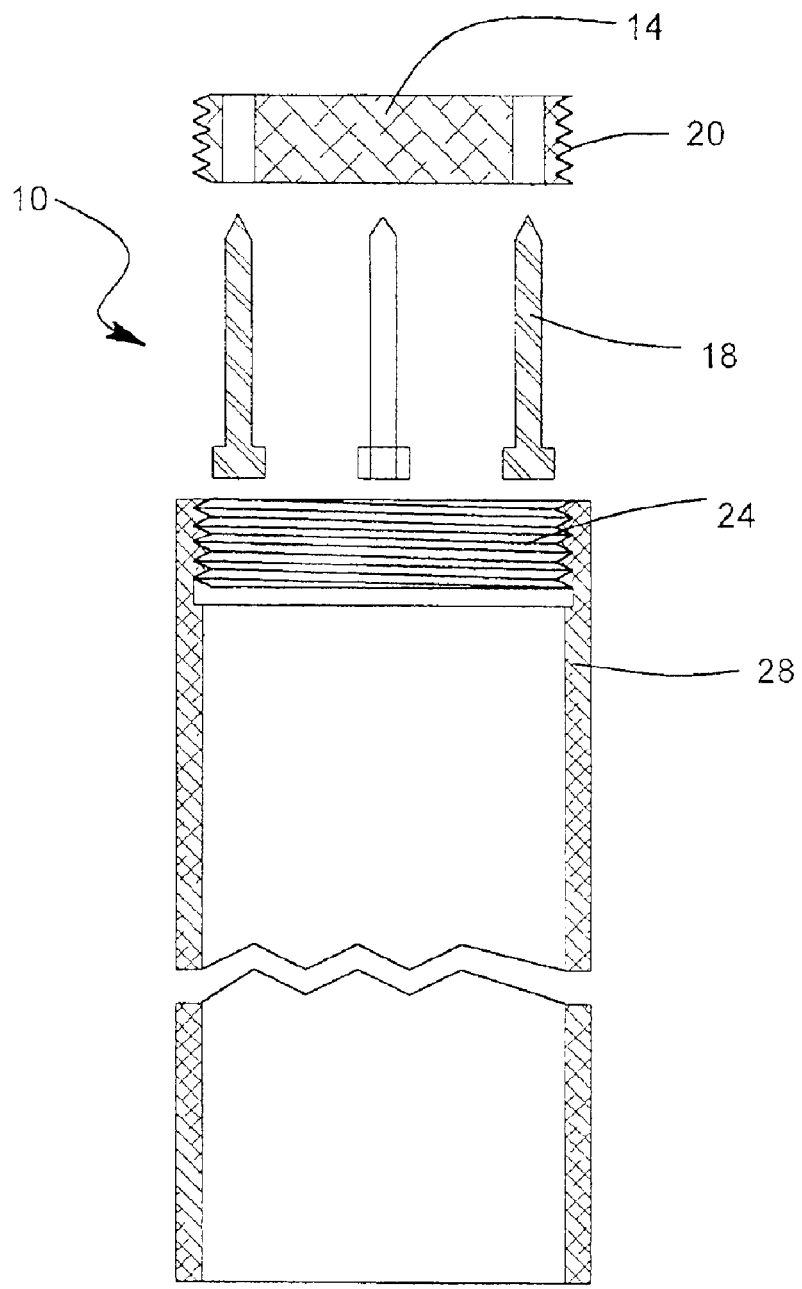
FIG. 3 shows an exploded view of the joint of FIG. 1 with respect to the cylinder.
Figure 4:
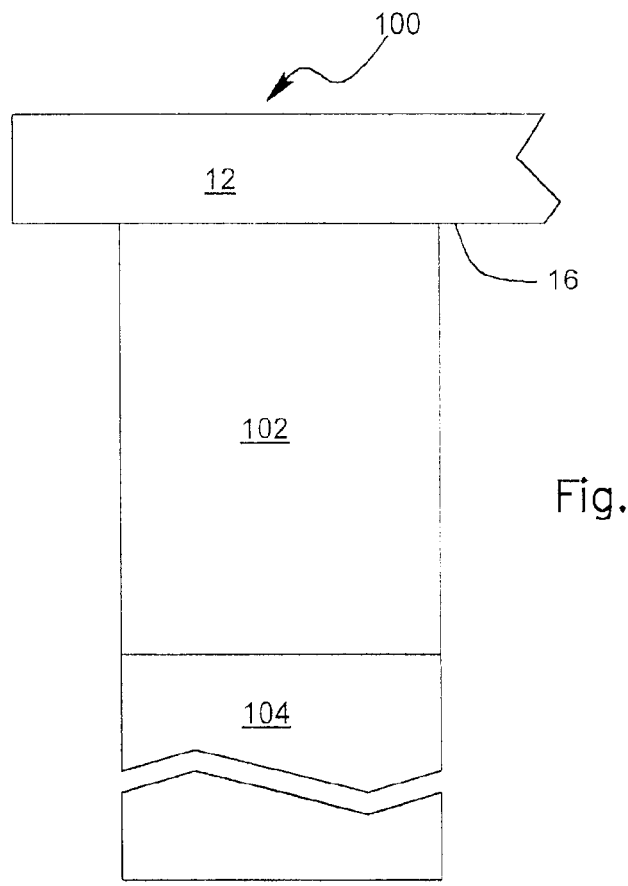
FIG. 4 shows a side view of another embodiment of the joint assembly of the present inventions including a cylindrical sleeve and solid leg wherein the sleeve is attached to the leg by a center bolt.
Figure 5:
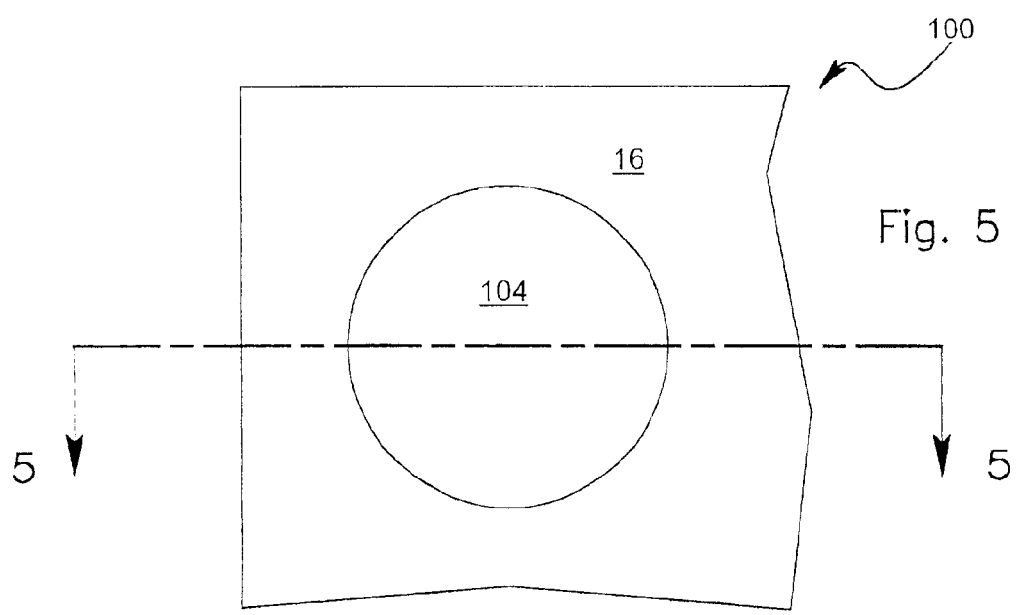
FIG. 5 shows a bottom view of the embodiment of FIG. 4.
Figure 6:
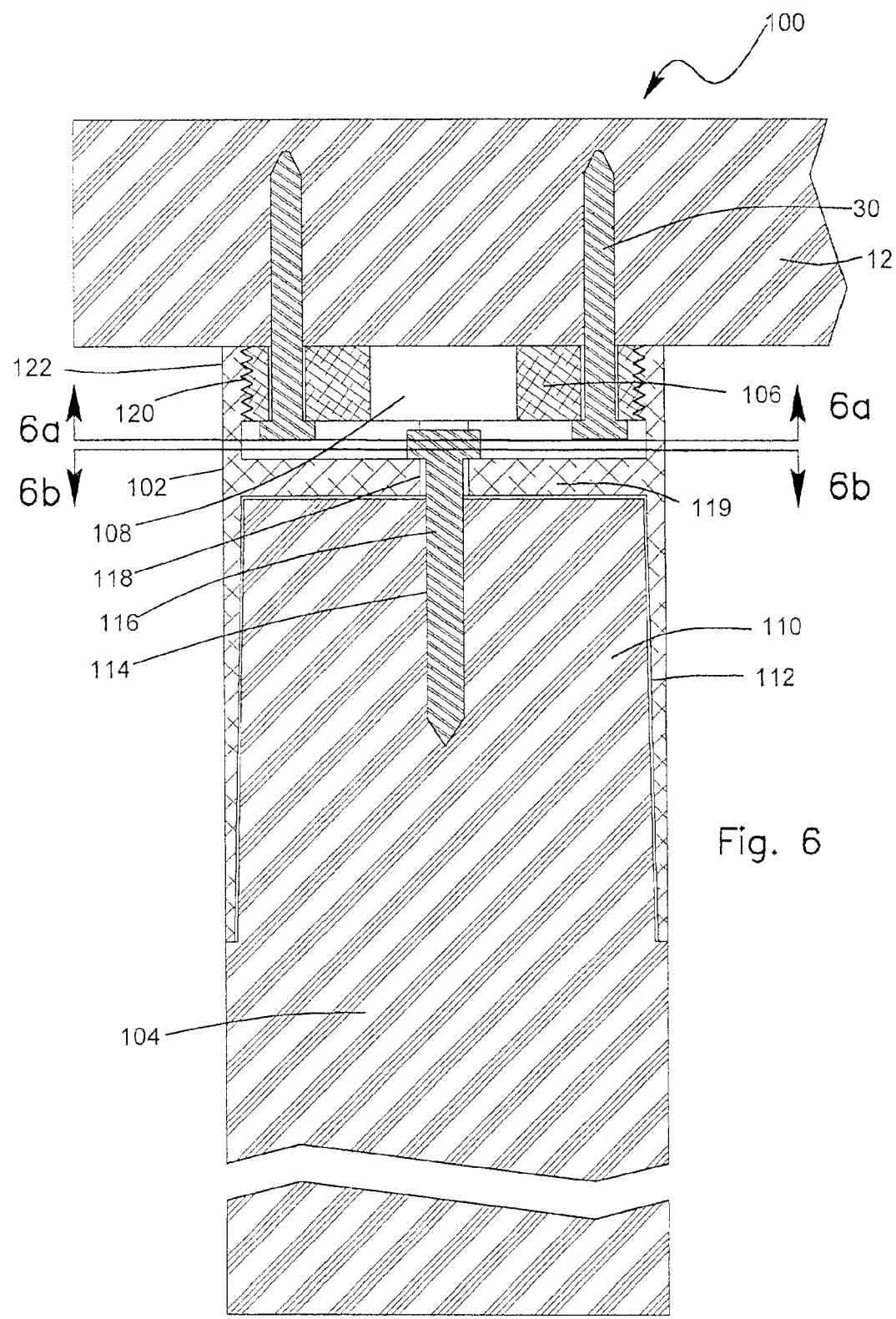
FIG. 6 shows a cross-sectional view of the embodiment of FIG. 5 along the lines 5—5.
Figure 7:
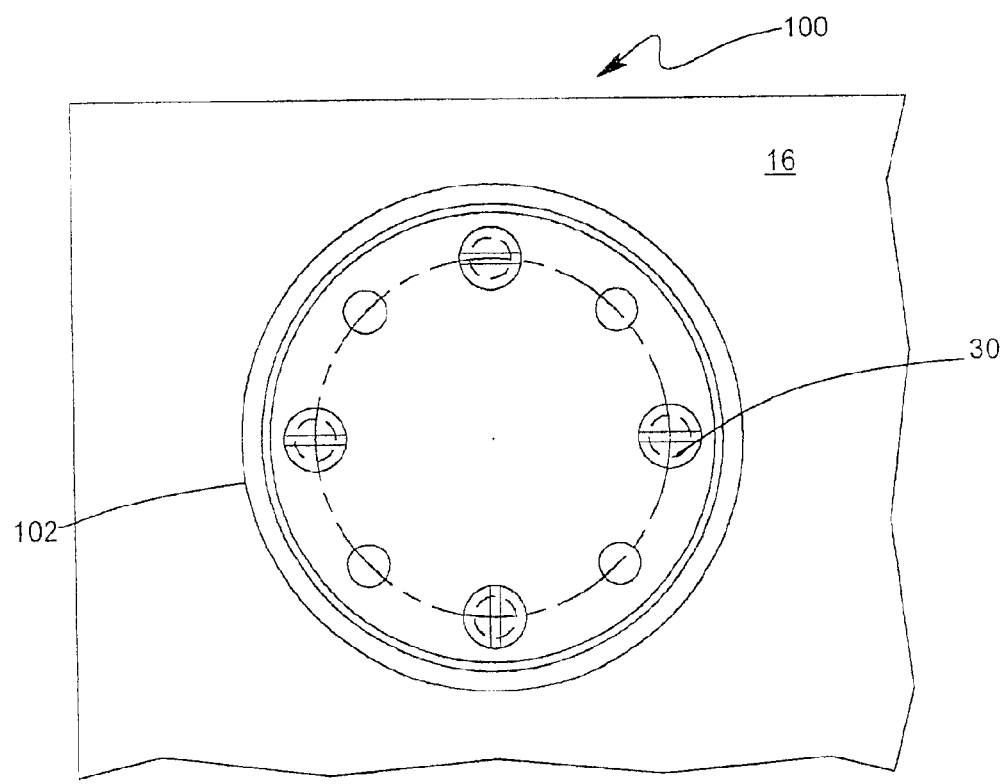
Figure 8:
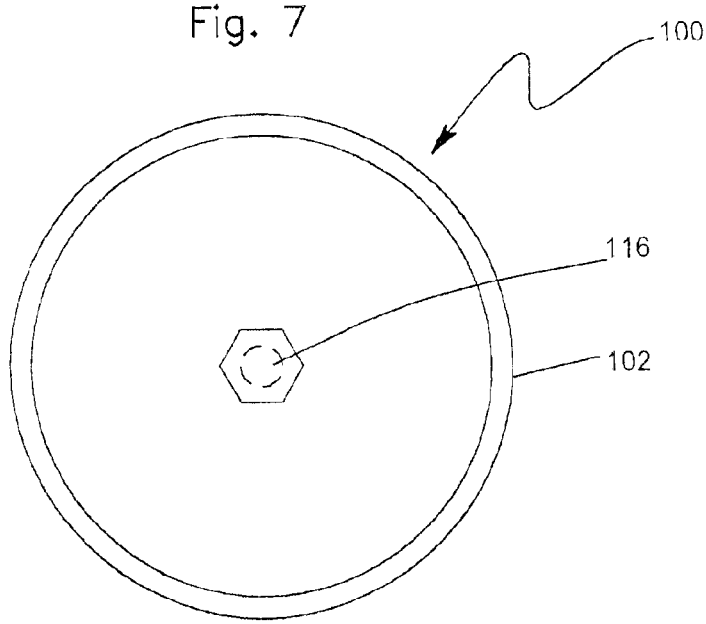
FIG. 8 shows a sectional view of the embodiment of FIG. 6 along the lines 6b—6b.
Figure 65:
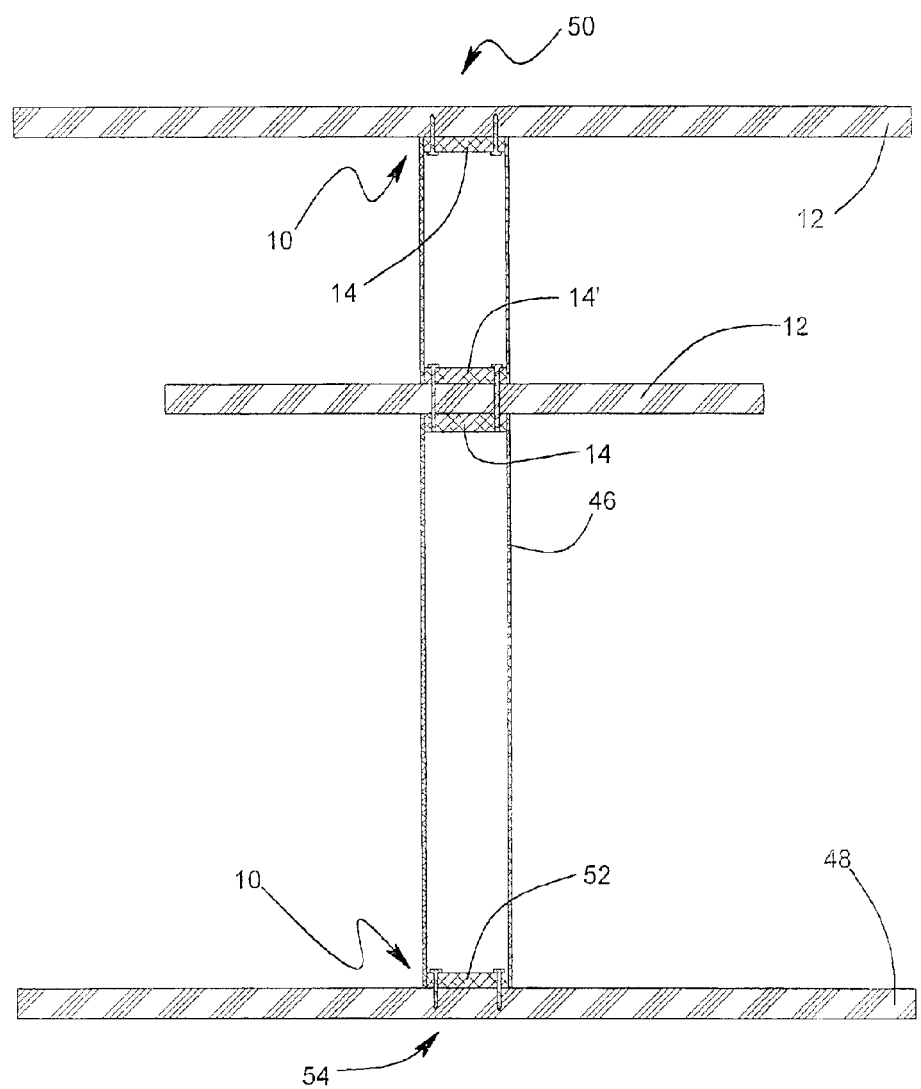
FIG. 65 shows a cross-sectional view of a table with a shelf attached with a joint as shown in FIG. 14.
Figure 66:
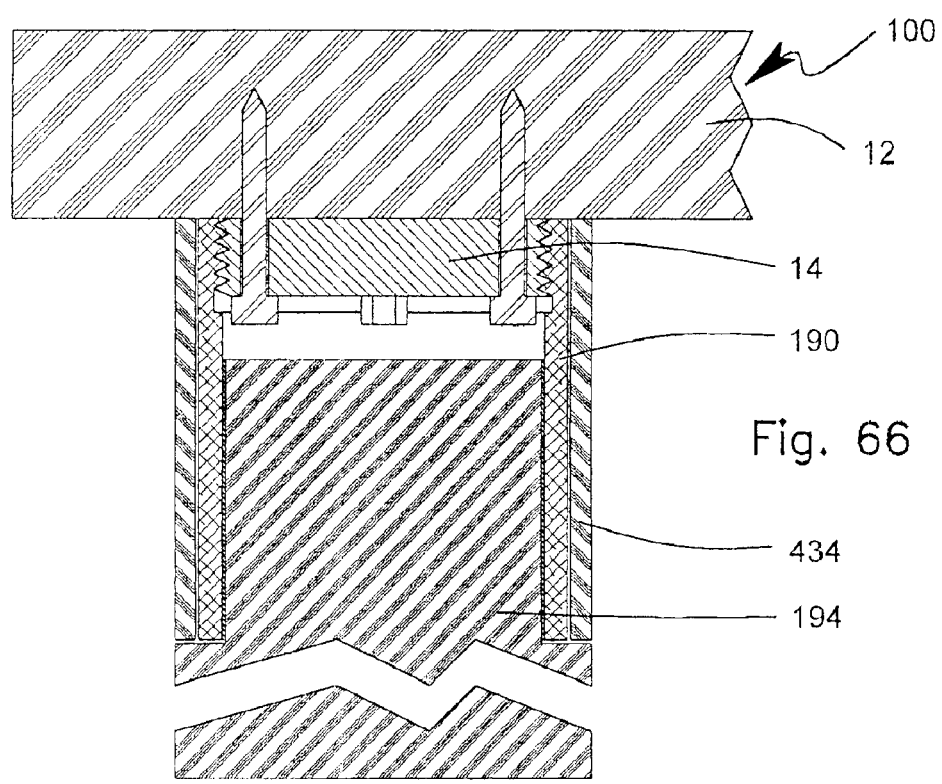
FIG. 66 is a sectional view of a joint as shown in FIG. 33 with the addition of a sheath to cover or disguise the threaded sleeve.

Referring to FIGS. 1–66, wherein like reference numerals indicate like parts, an embodiment 10 of the joint of the present invention can be seen in FIGS. 1–3, 14, 39, 43–45, 50, 52–53 and 59–65. The joint 10 comprises a plate 12 having detachably attached thereto a disk 14 on an engagement surface 16. The disk 14 is connected to the plate 12 by one or more of any suitable type bolts or screws 18. When a multiple number of bolts are used, such bolts are typically laid out in a bolt circle 19 as known to the art. The disk 14 has an outer diameter with threads 20 forming a threaded connection 22 mated to interior threads 24 formed on an inside diameter 26 of a tube 28.

Figure 39:
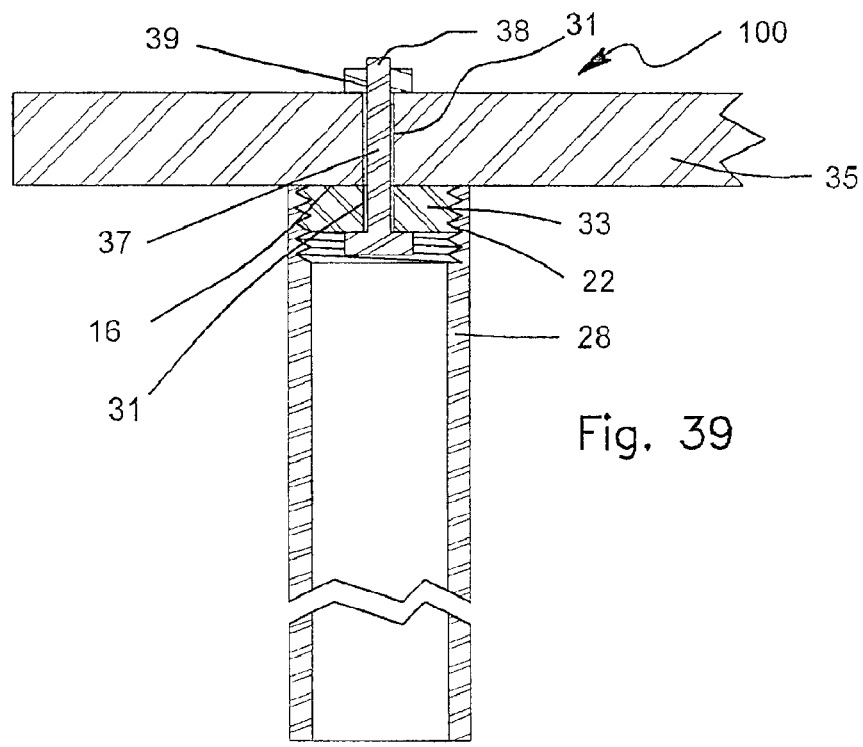
FIG. 39 shows a cross-sectional view of a variation of the joint as seen in FIG. 2.
Figure 60:
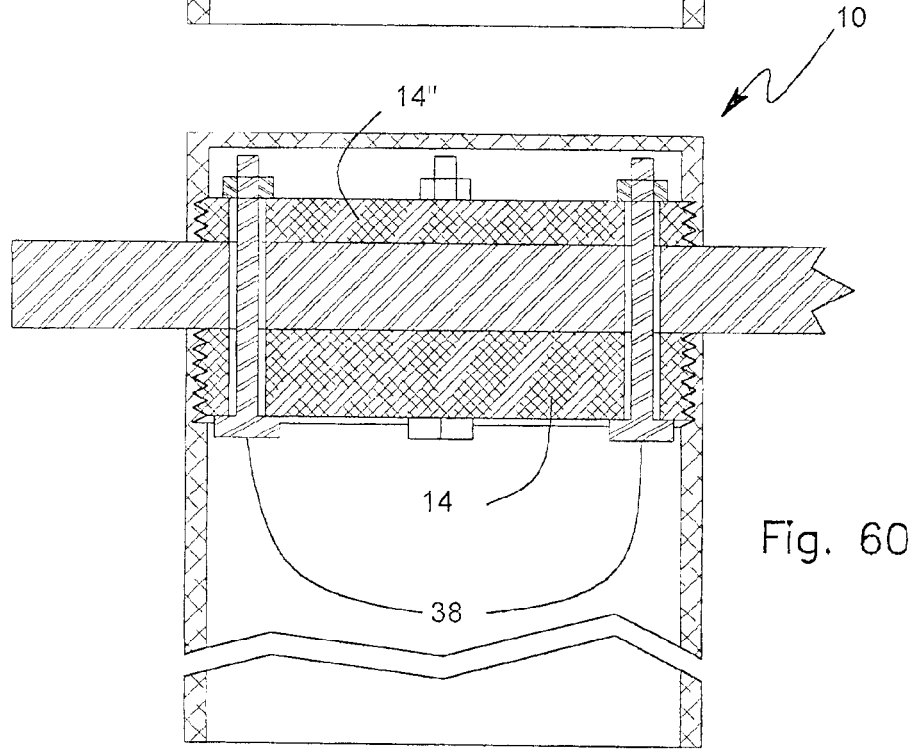
FIG. 60 shows a cross-sectional view of a variation of FIG. 59 wherein the connecting bolts are protruding through the upper disk and use of the cap is preferred.
Figure 61:
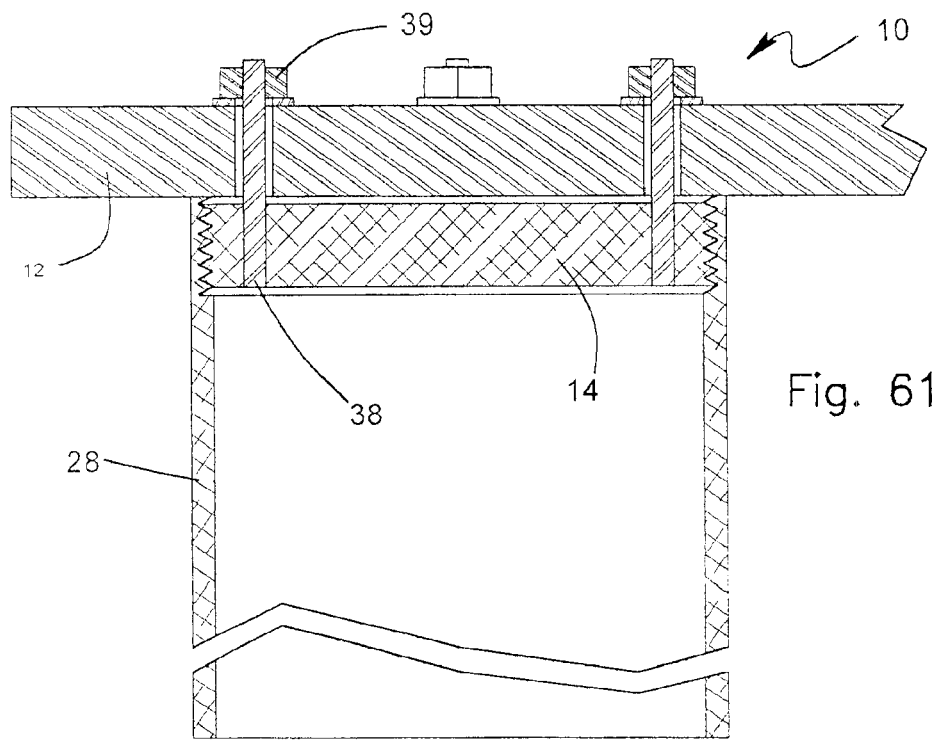
FIG. 61 shows a cross-sectional view of a variation of the embodiment of FIG. 39 wherein multiple studs attach the connecting disk to the plate and the cylinder and plate can be preloaded from the opposite side.
Figure 62:
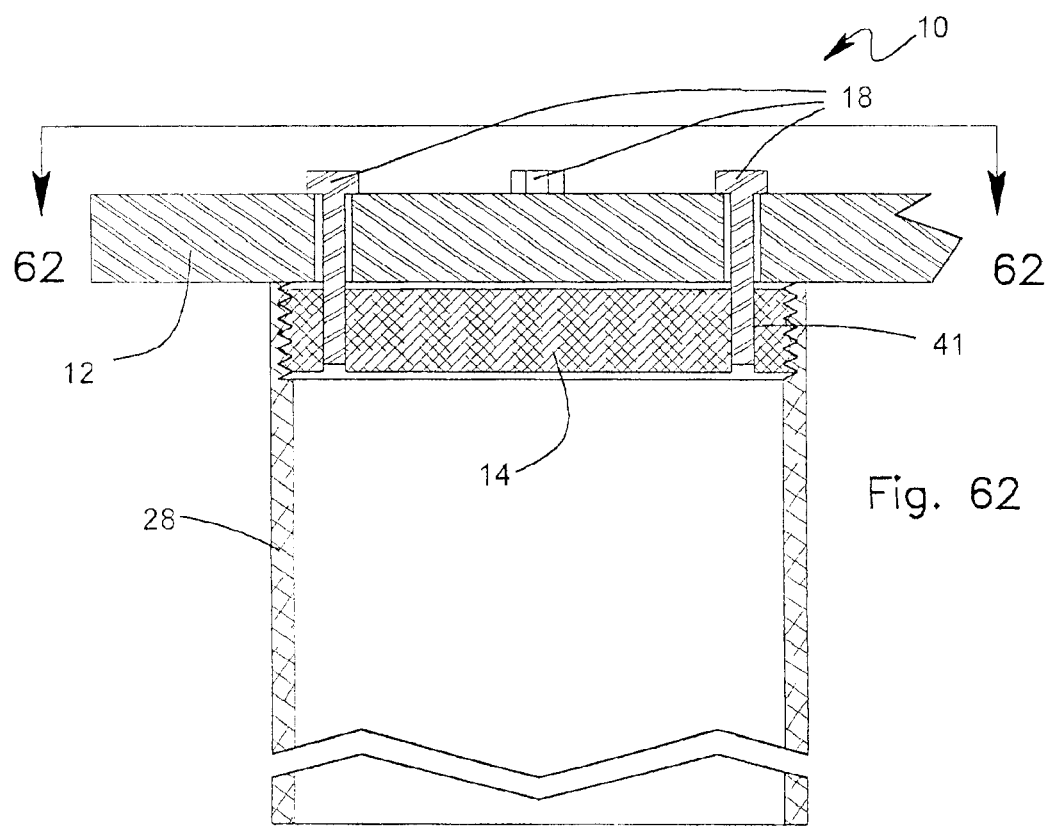
FIG. 62 shows a cross-sectional view of a variation of the embodiment of FIG. 2 except that the connection disk is attached to the plates by bolts preloaded from the opposite (plate) side.
Figure 64:
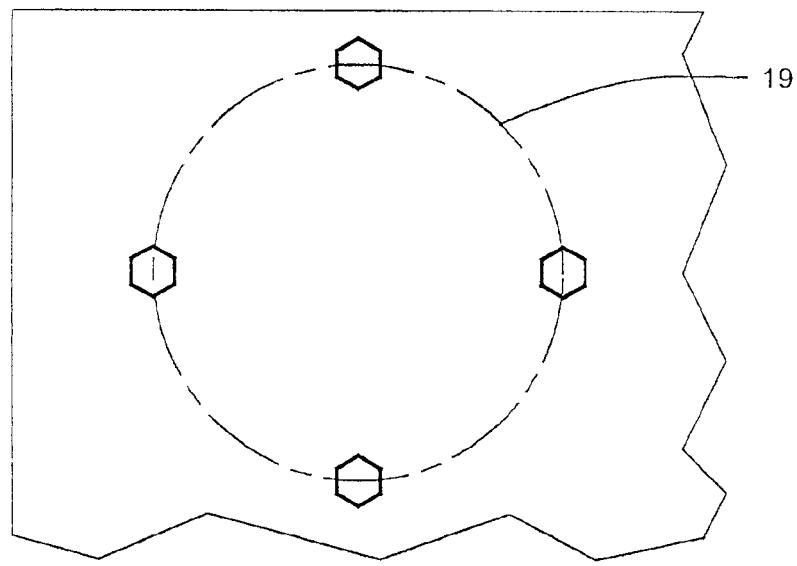
FIG. 64 is a top view of the embodiment of FIG. 62 showing layout of the bolts.

In the practice of the present invention, as a first step, the disk 14 is attached first to the plate 12 by tightening the bolts 18 within threaded holes or pilot holes 30 formed in the plate engagement surface 16 so that the disk is fixed securely thereto. Next, the tube 28 is attached to the disk 14 by the threaded connection 22 so that a tube abutment surface 32 abuts the plate engagement surface 16 to make a joint 10 of the present invention. Alternatively, a bore 31 can be formed through a threaded disk 33 and a plate 35 through which a body 37 of a bolt 38 can pass for engaging a nut 39 and securing the disk 33 to the engagement surface 16 as seen in FIG. 39. Multiple bolts 38 having nuts 39 can be used to secure the disk 14 as seen in FIG. 60. In such a manner, the bolts 38 can be preloaded from the opposite (top) side. Alternatively, FIG. 62 shows the bolts 18 extending from the opposite (top) side into threaded holes 41 in the threaded disk 14.

Figure 14:
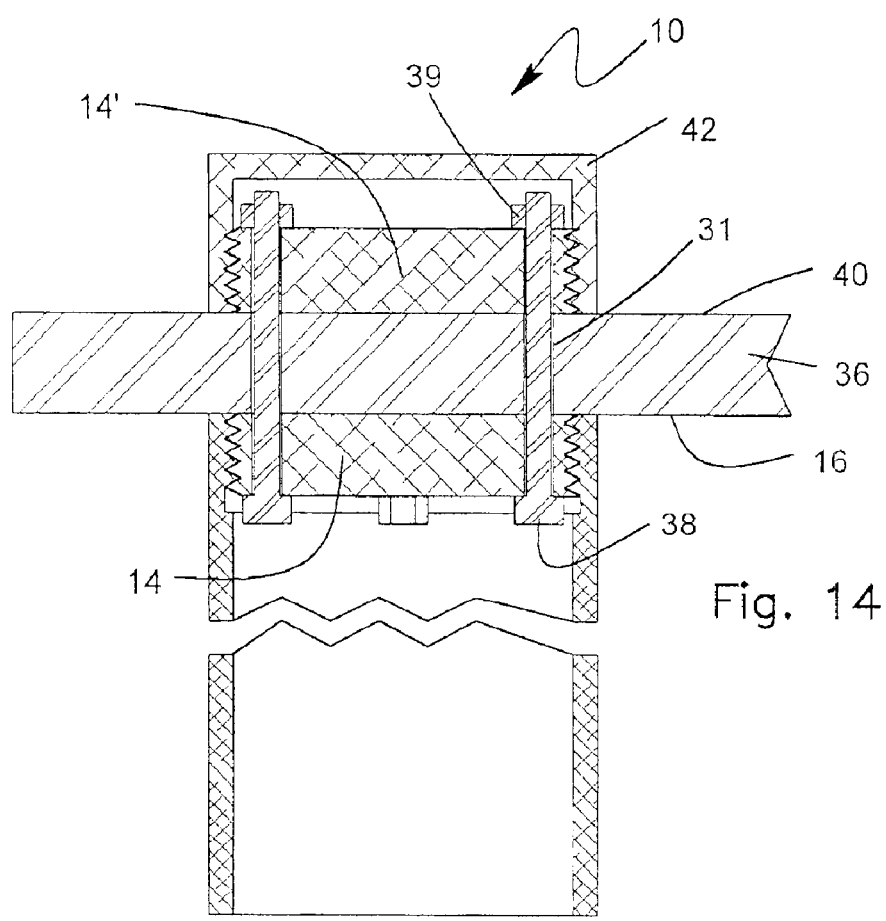
FIG. 14 shows a cross-sectional view of a variation of the embodiment of FIG. 2 wherein the plate is bolted between first and second connecting disks and the second disk has a cover.
Figure 20:
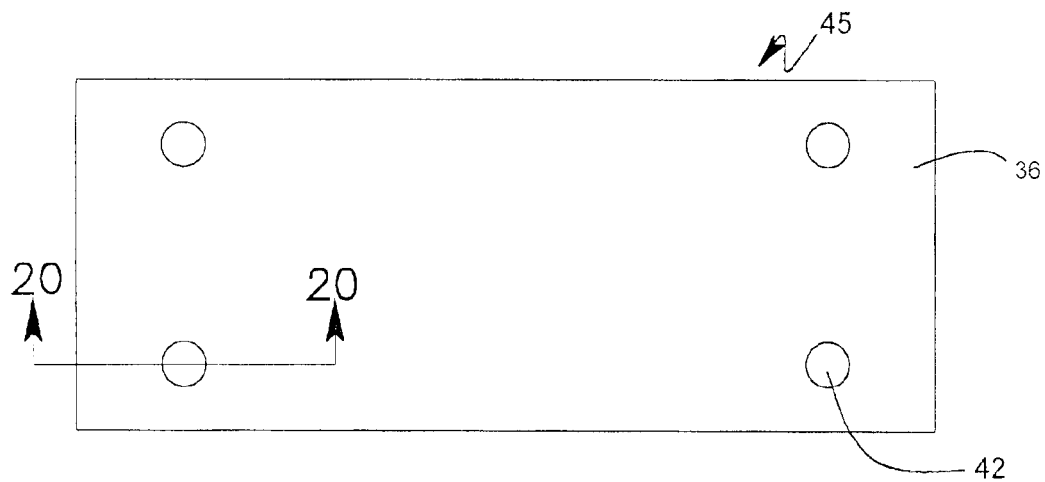
FIG. 20 shows a top view of the shelving system of FIG. 19.
Figure 19:
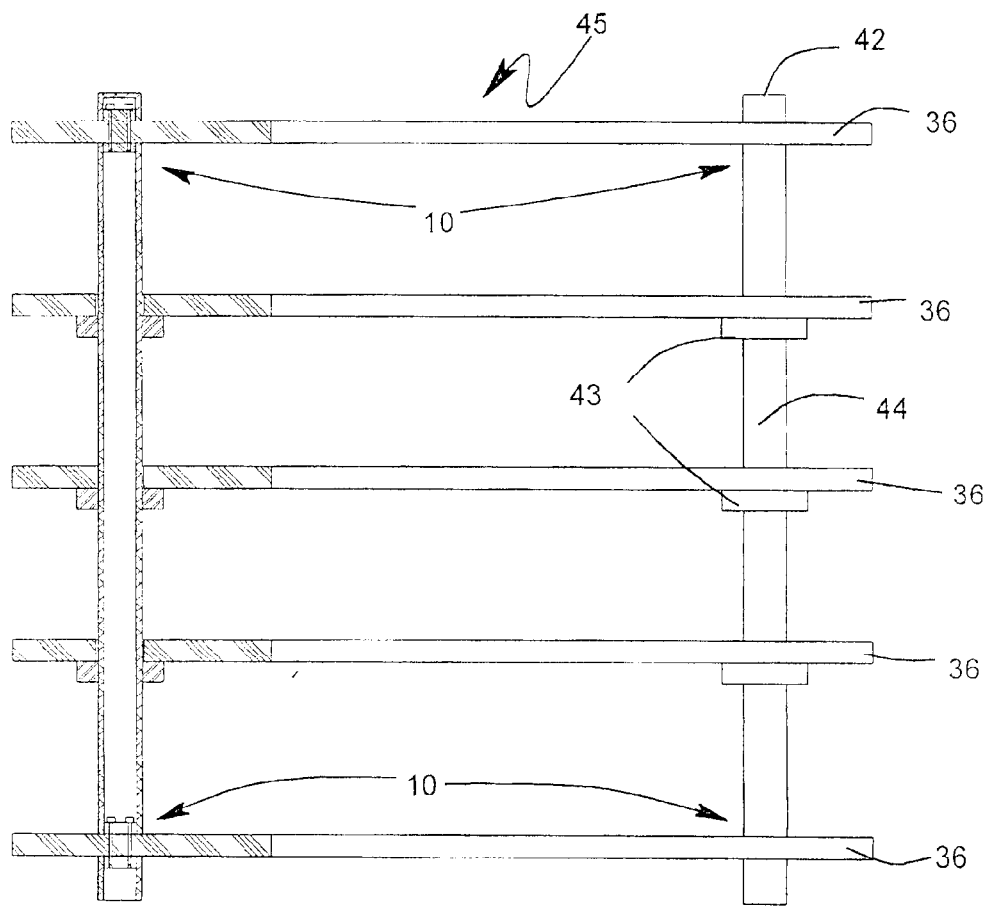
FIG. 19 shows a side view (part in cross-section along the lines 20—20 of FIG. 20) of a series of shelves attached together using the joint of the present invention in accordance with FIG. 14.
Figure 59:
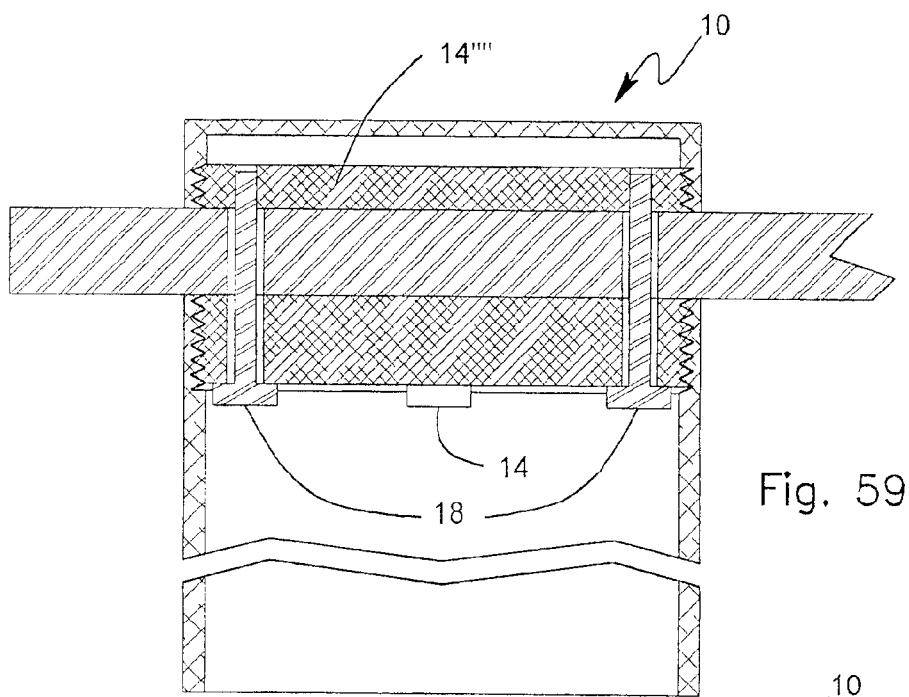
FIG. 59 shows a cross-sectional view of a variation of the embodiment of FIG. 14 (sandwich structure) wherein the second upper disk is smaller than the lower disk and has threaded screw holes so the connecting bolts are not protruding through the upper disk.
Figure 63:
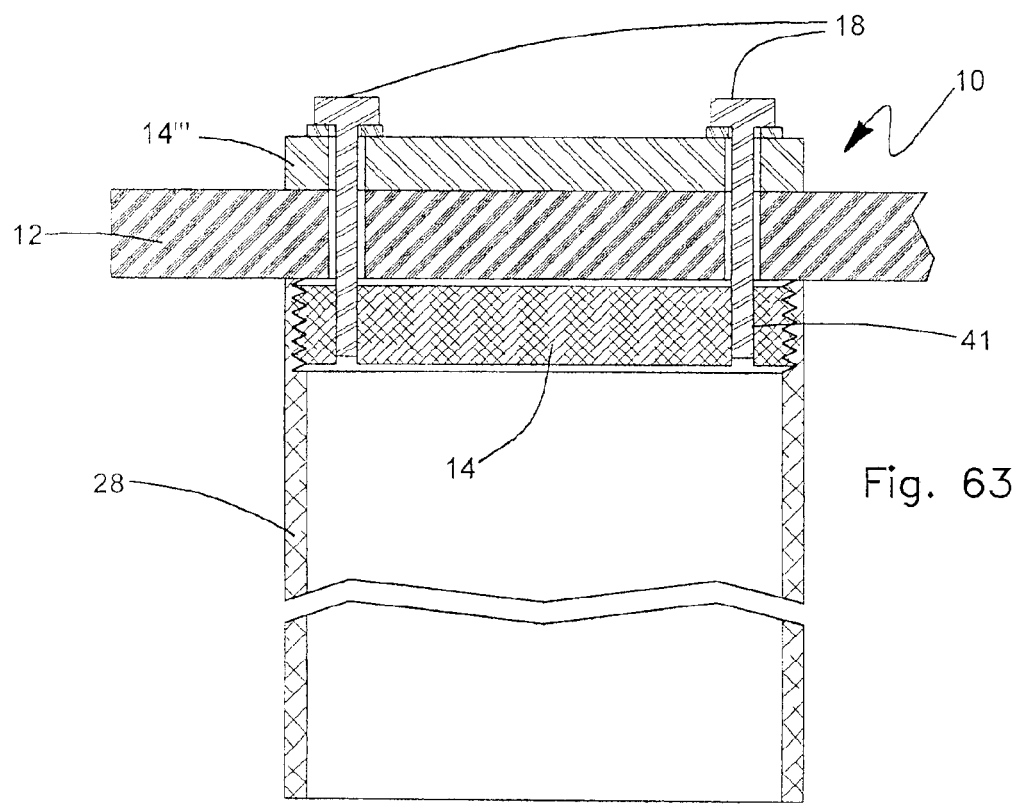
FIG. 63 shows a cross-sectional view of a variation of the embodiment of FIG. 62 wherein the plate is sandwiched between upper and lower disks with opposite side preloaded bolts and the opposite plate is not externally threaded.

A variation of joint 10 of the present invention can be seen in FIG. 14. A plate 36 is sandwiched between first and second threaded disks 14, 14' having multiple bores 31 receiving bolts 38 secured by nuts 39 wherein the second disk 14' engages an upper surface 40 of the plate 36. The second disk 14' preferably has a threaded outer diameter suitable for attachment of a second cylinder such as for example a cap 42 or a spacer 44 as seen in FIGS. 19–20 and 65. In such a manner plates 36 can be stacked to form a shelf system 45, for example. Compression collars 43 are disposed between load-being plates 36 on the spacer 44 for adjustable supports. As seen in FIG. 65 spacers alone can provide that support but are not as adjustable. As seen in FIG. 59 an upper disk 14"" can have threaded screw holes to receive screws. As seen in FIG. 60, an upper disk 14" can have a different thickness from the lower disk 14. Or as seen in FIG. 63, an upper disk 14''' can be non-threaded on the outer diameter.

Figure 15:
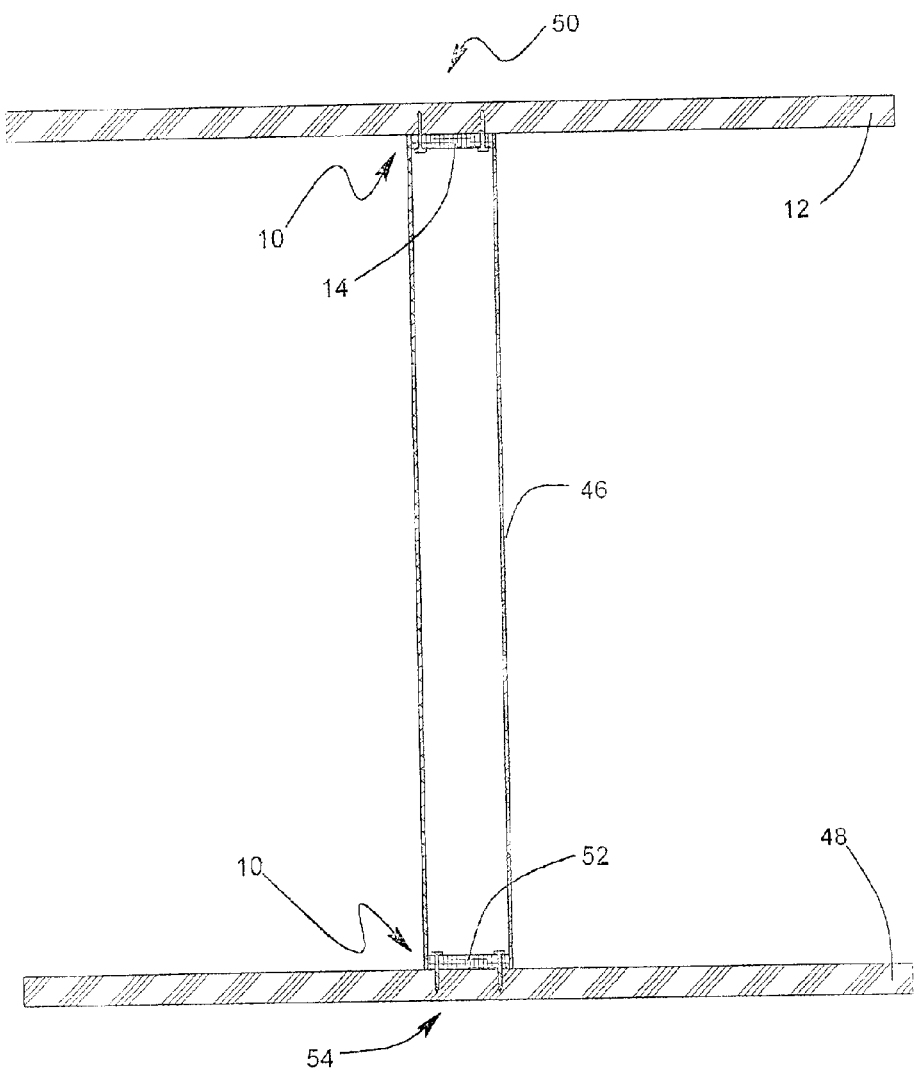
FIG. 15 shows a cross-sectional view of a cylinder joined to plates at both ends in accordance to the teaching of the present invention.

In FIG. 15, the joint 10 of the present invention is formed at each end of a tube 46 to attach a second plate 48 to provide a base for a table 50 by means described above. In a small table or stand both threads can be right or left handed because the top and bottom plates can be rotated with respect to each other.

Figure 16:
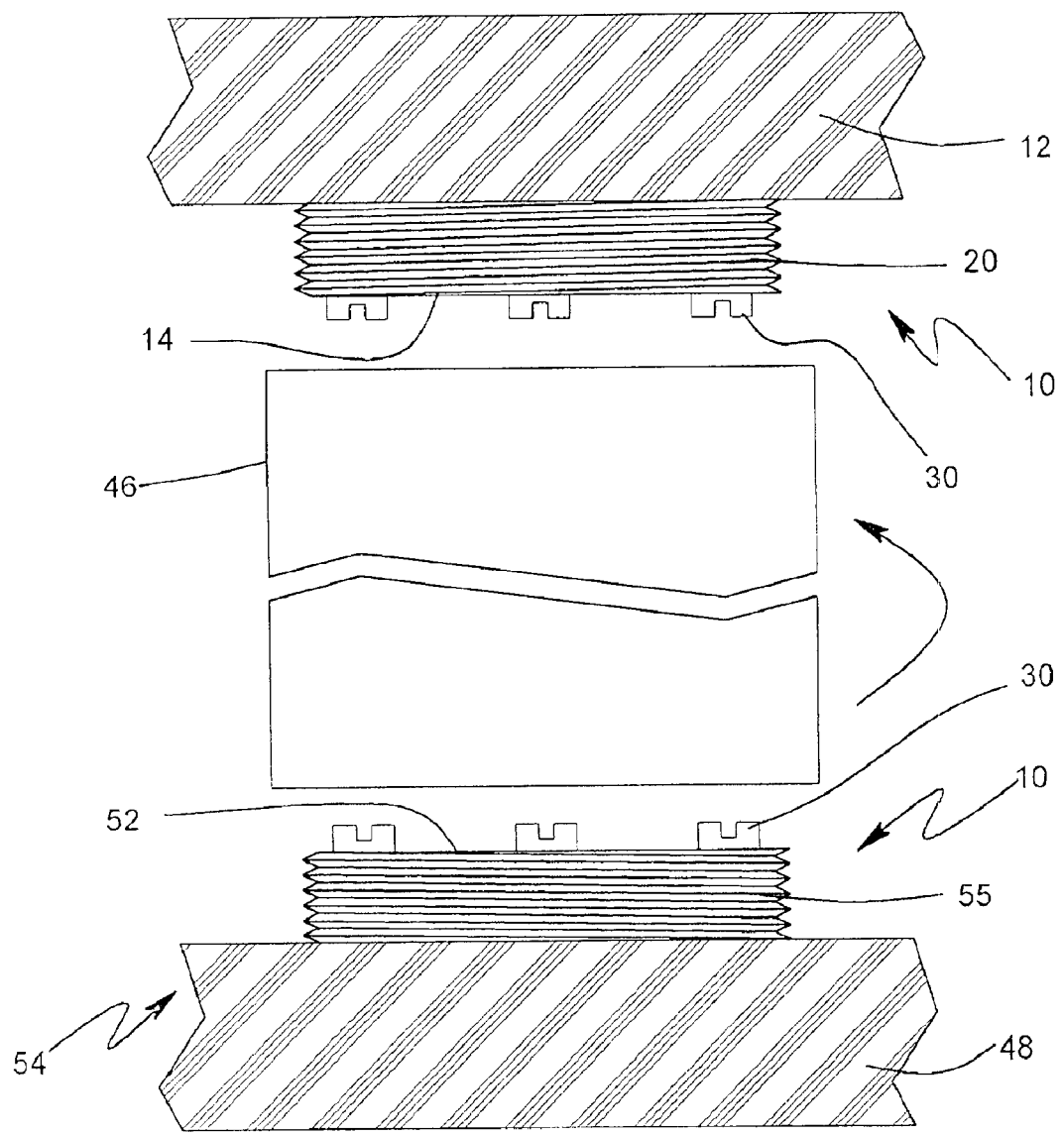
FIG. 16 shows a partial exploded cross-sectional view of the invention of FIG. 15 with right hand threads on the top and left hand threads on the bottom.
Figure 17:
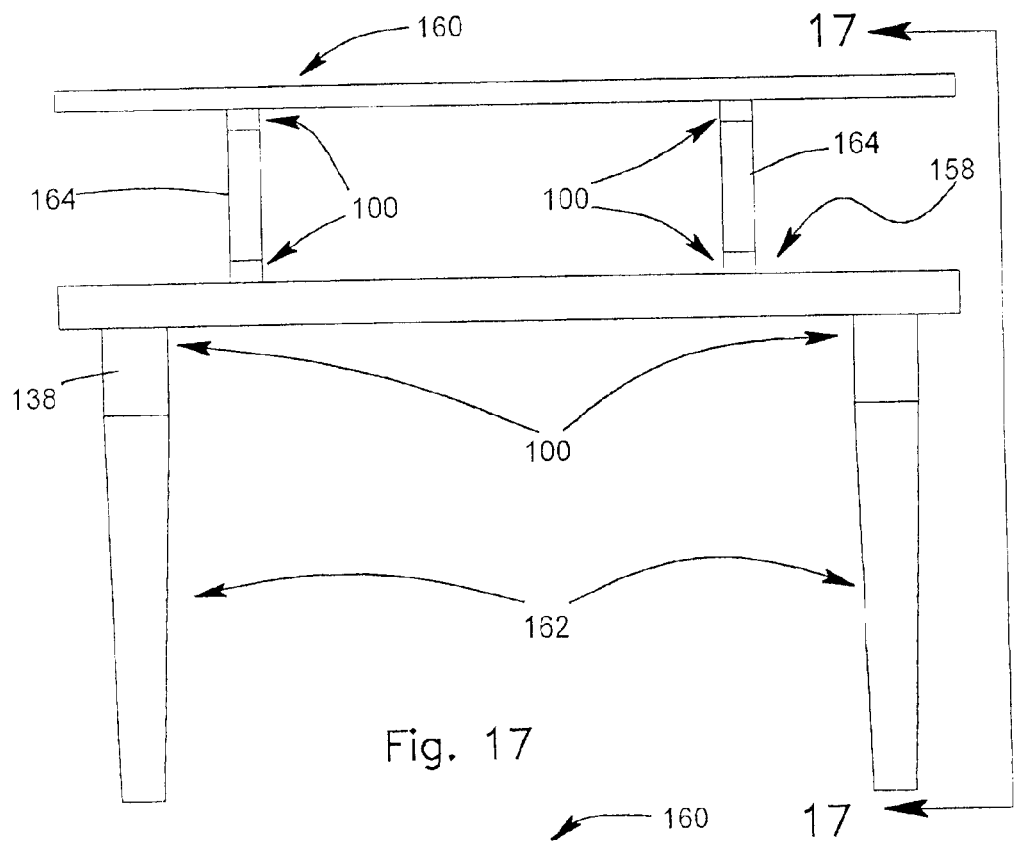
FIG. 17 shows a front view of a table with an attached shelf employing the joint of the present invention in accordance to FIGS. 11 and 16.
Figure 18:
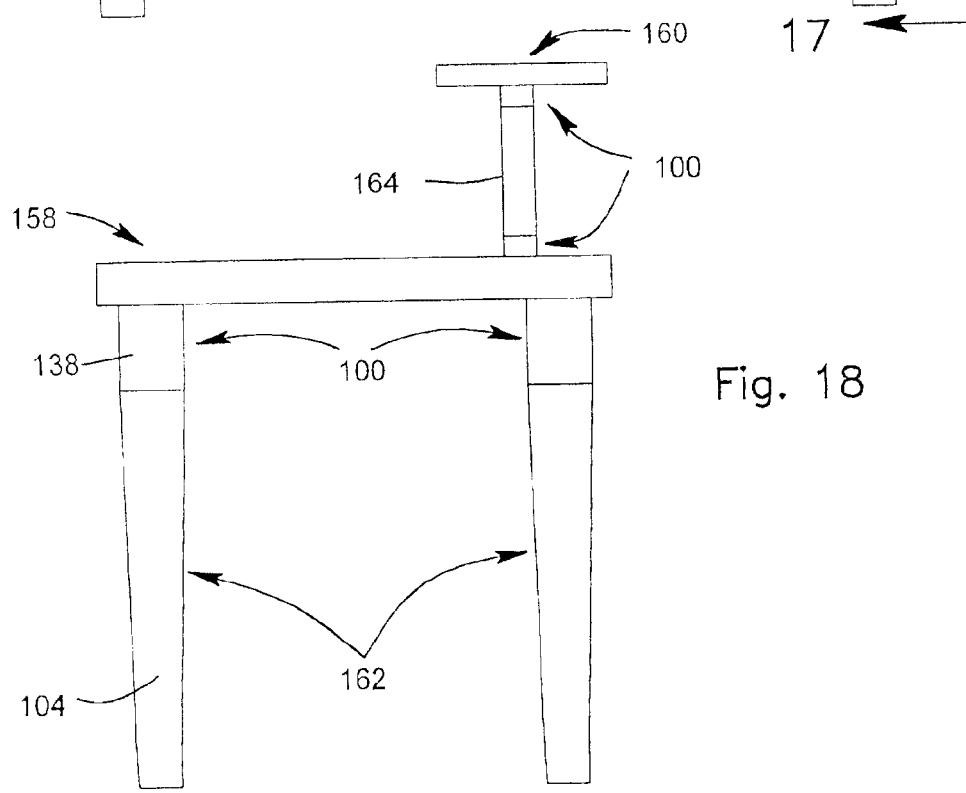
FIG. 18 shows a side view of the table of FIG. 17.

In FIG. 16 a disk 52 secured to the plate 48 at an opposing end 54 of the tube 46 typically has oppositely handed outer threads 55 if the plates 12 and 48 do not rotate with respect to each other. The big advantage of this is that one end of a connection does not have to be rotated relative to the other end. They can be brought together by rotating only the intervening connecting tube or cylinder as shown in later figures.

Figure 21:
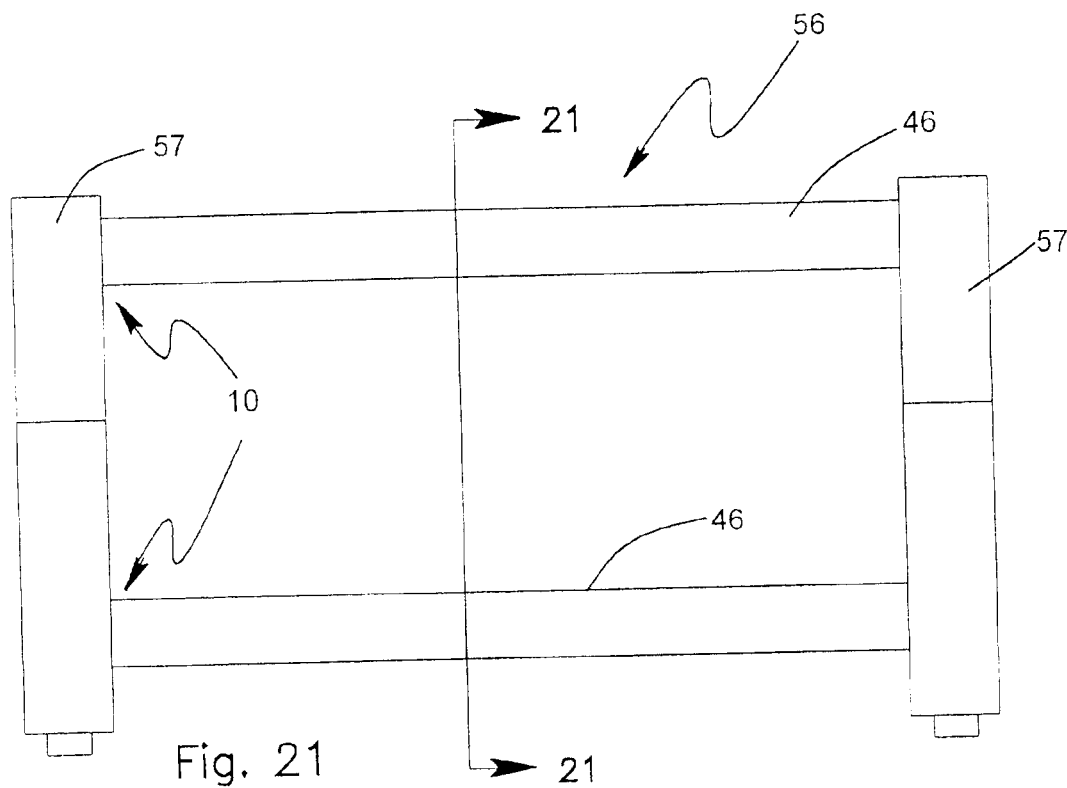
FIG. 21 shows a front view of a sofa frame made using the joint of the present invention in accordance with FIG. 16 and FIG. 2.
Figure 22:
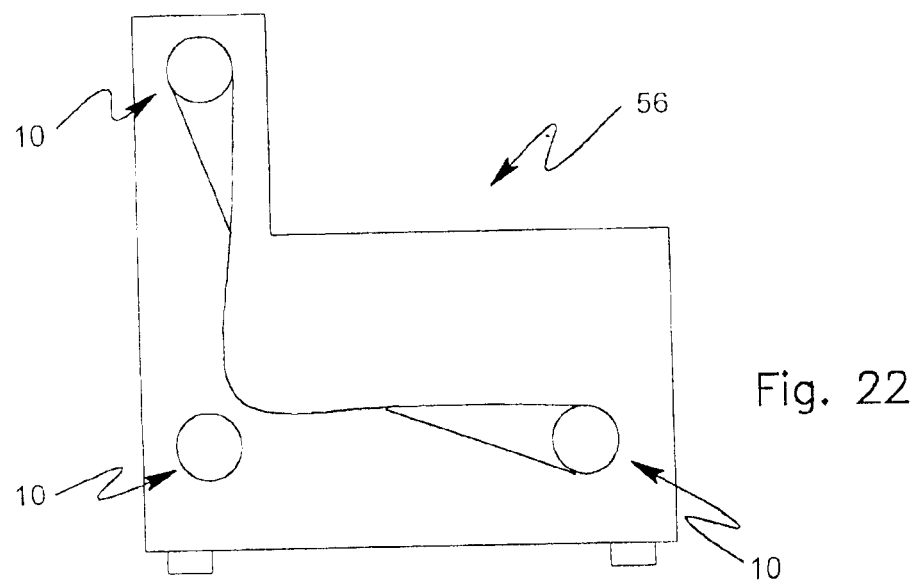
FIG. 22 shows a side sectional view of the sofa frame of FIG. 21 along the lines 21—21.
Figure 23:
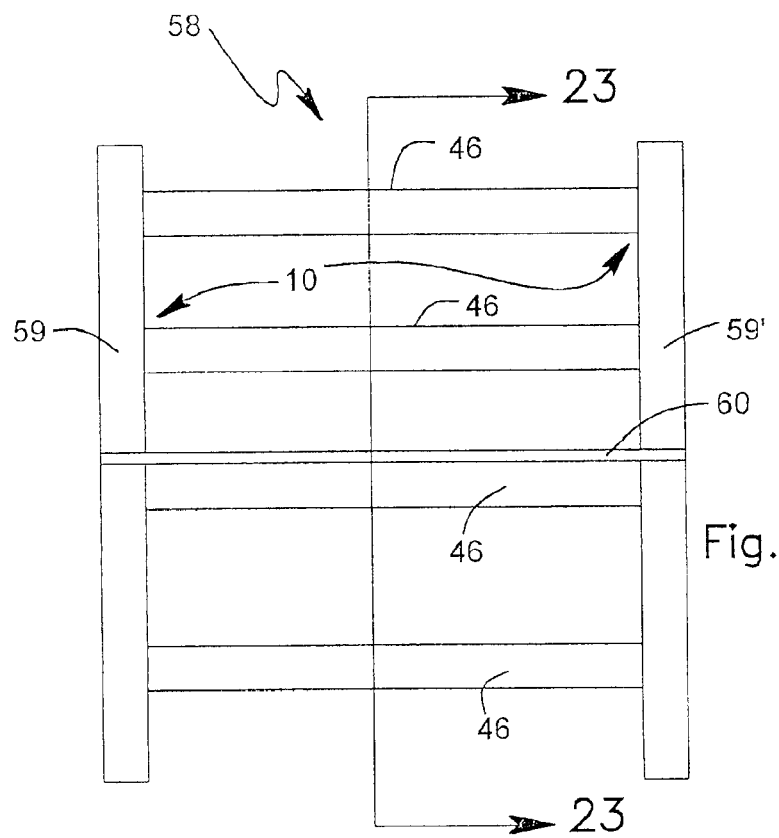
FIG. 23 shows a front view of a chair employing joints of the present invention in accordance to FIG. 2 and FIG. 16.
Figure 24:
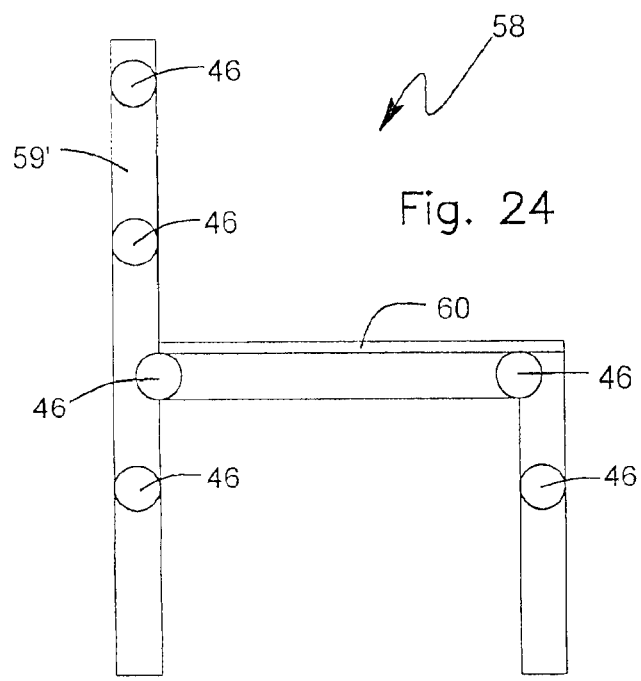
FIG. 24 shows a side sectional view of the chair of FIG. 23 along the lines 23—23.
Figure 27:
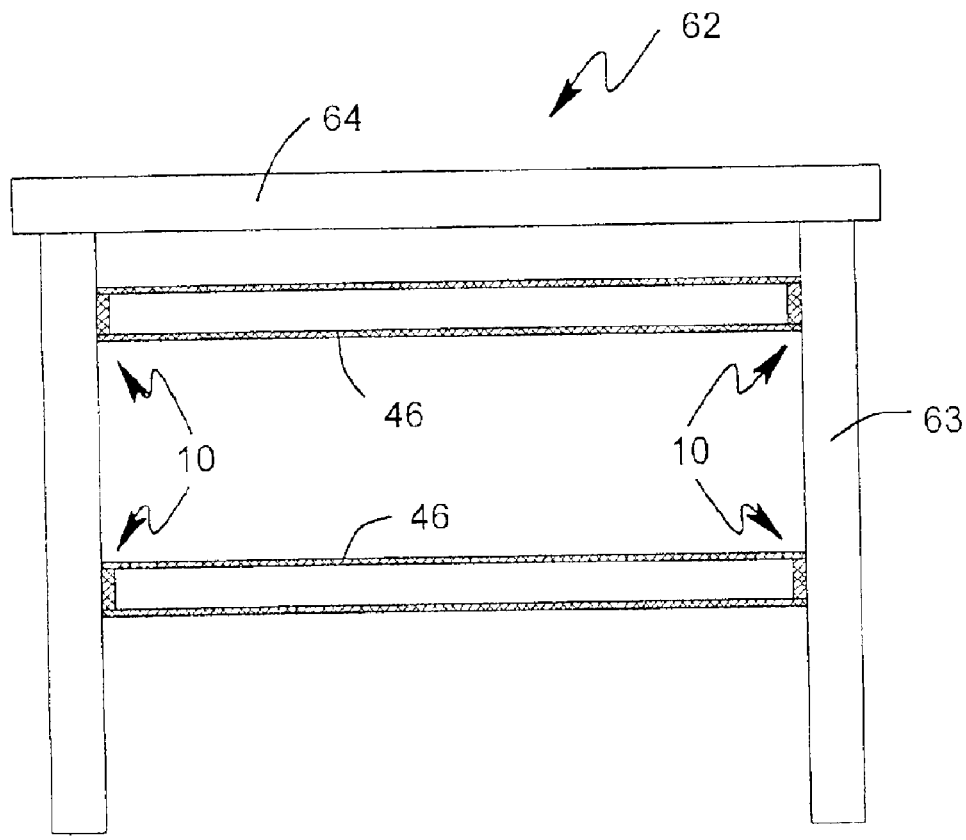
FIG. 27 shows a table or stool having legs joined in accordance with the prior art but employing stretchers having a joint of the present invention.

Multiple joints 10 of the present invention can be used at opposing ends of one or more tubes 46 to form support frames for various types of furniture such as for example a sofa 56 having arms 57 as seen in FIGS. 21–22, a chair 58 having sides 59, 59' and seat 60 as seen in FIGS. 23–24, or stretchers for a table or stool 62 having legs 63 and a top 64 as seen in FIG. 27.

Figure 25:
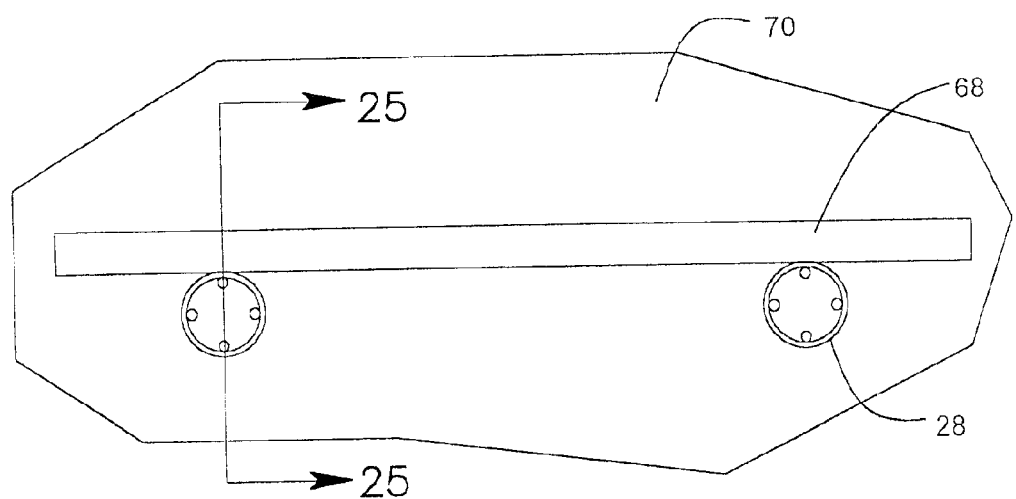
FIG. 25 shows front view of a wall-attached shelf employing the joint of the present invention in accordance with FIG. 2.
Figure 26:
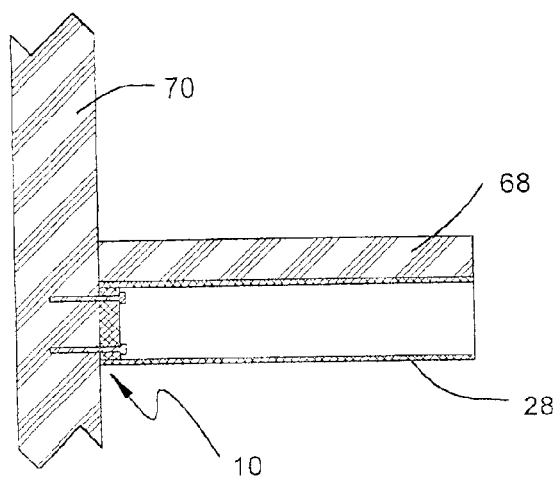
FIG. 26 shows a side sectional view of the shelf of FIG. 25 along the lines 25—25.
Figure 28:
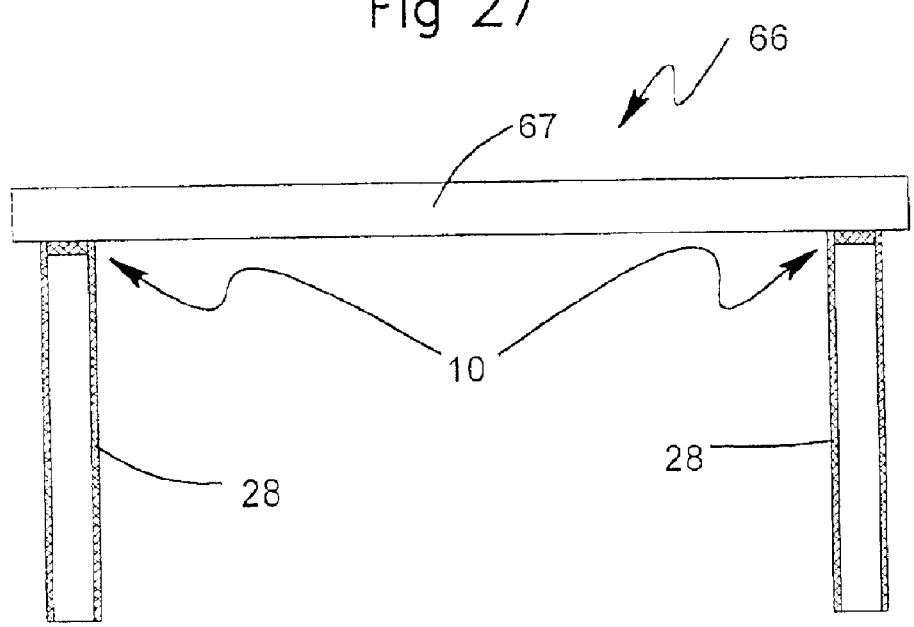
FIG. 28 shows a table having legs joined in accordance with the present invention.

Joints 10 of the present invention can be used at upper ends of multiple tubes 28 at corners of a table 66 having as table top 67 as seen in FIG. 28 to form the legs of the table 28. Alternatively, joints 10 can be cantilevered as seen in FIGS. 25–26 to make tubular support brackets for a shelf 68, for example. Tubes 28 are horizontally attached at one end of a vertically oriented plate or planar surface 70.

Figure 43:
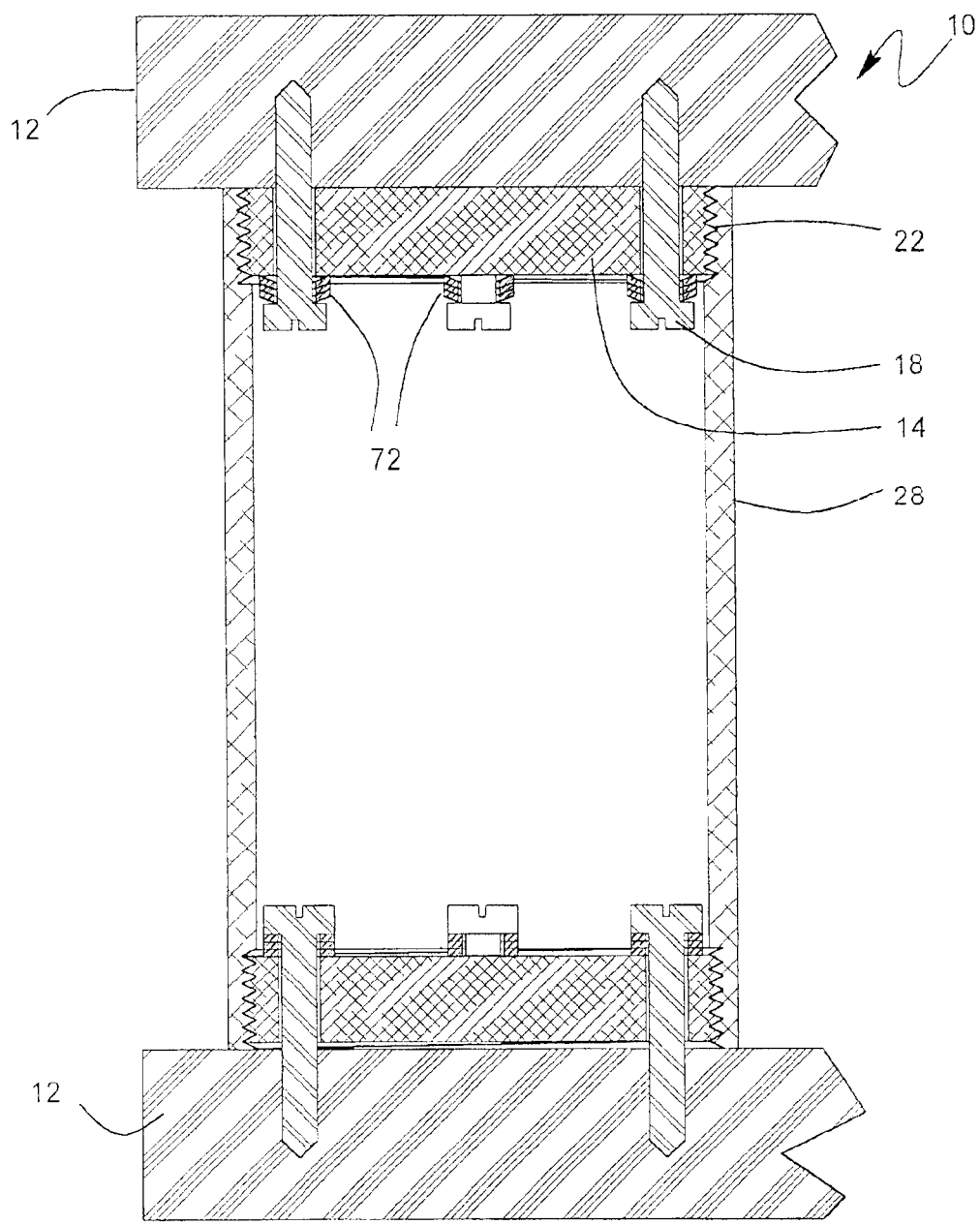
FIG. 43 shows a cross-sectional view of a variation of the joint of FIG. 15 or 16 employing spring loaded bolts.
Figure 52:
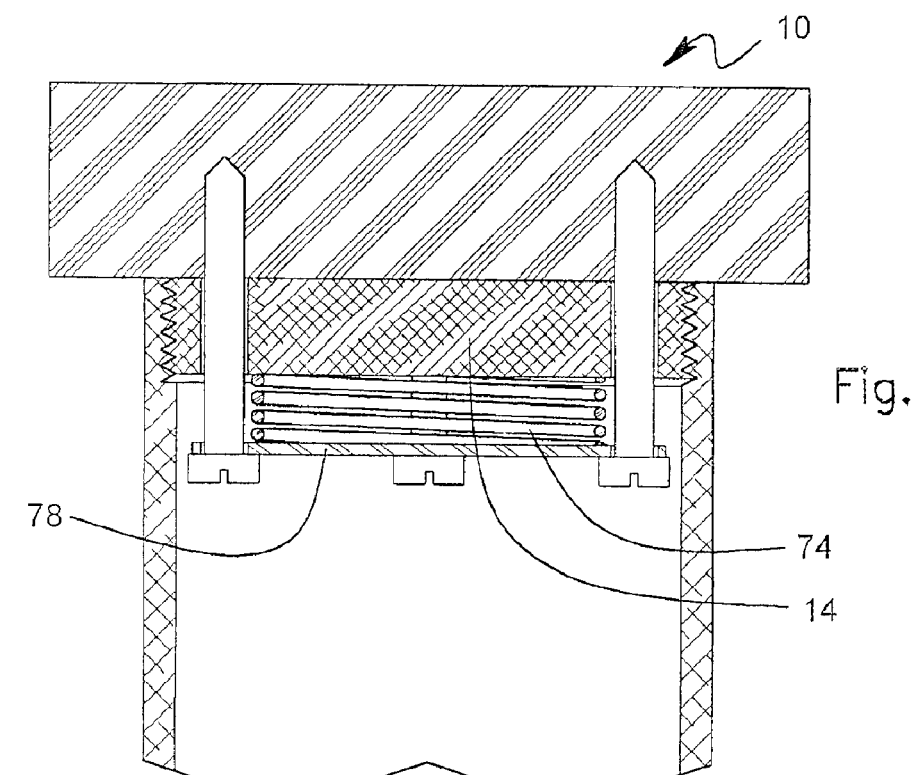
FIG. 52 shows a cross-sectional view of a variation of the joint of FIG. 43 with spring-loaded bolts.
Figure 53:
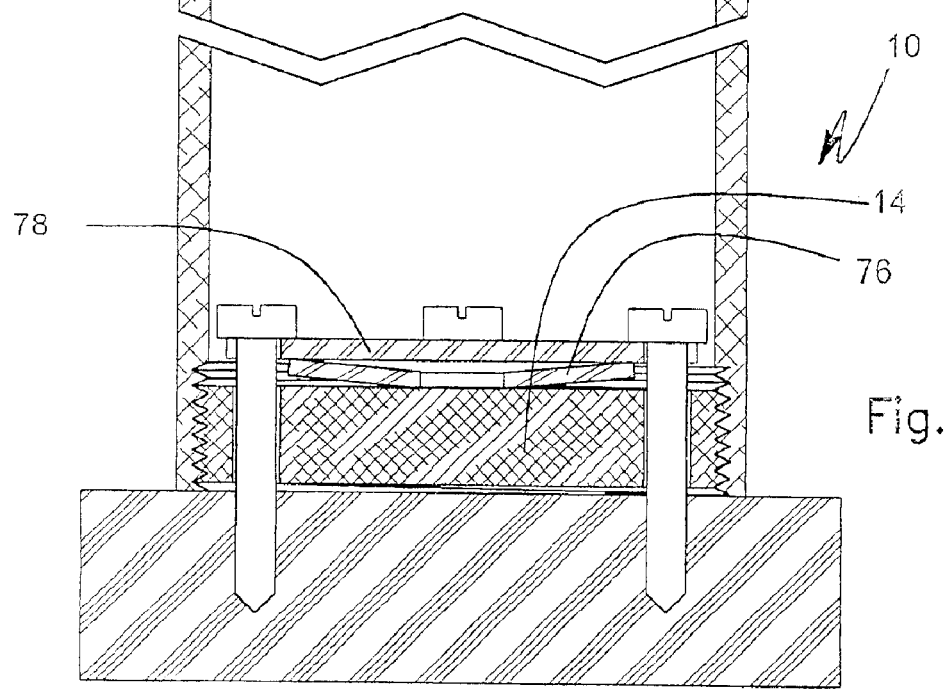
FIG. 53 shows a cross-sectional view of a variation of the joint of FIG. 52 employing a Belleville spring.

Another variation of the joint 10 can be seen in FIGS. 43, 52–53, wherein the joints have locking means to prevent bolts 18 from backing out under heavy vibration, or to absorb moment shocks for example. As seen in FIG. 43, each bolt 18 can be provided a locking spring 72. The primary use of this feature however is so that when oppositely threaded plates are pulled together by turning the oppositely threaded cylinder, in the likely event that the second cylindrical end does not butt up against its flat abutting plate exactly when the first one does, the first one will not stop rotating at the plate 12 but will continue to rotate and lift the threaded disk, compressing the springs on the bolts, in order to allow the second end to butt up against its plate also, as shown in FIG. 43 and FIG. 53, or even to preload the second end by lifting the threaded disk at that end also. In the case where plates can rotate with respect to each other and they need to be aligned with respect to the other or where a square table leg needs to be at a certain angle with respect to the table, the preloaded threaded disk enables continued rotation under preload until the plate or table leg is aligned. Alternatively, this mechanism can comprise a center coiled spring 74 or Belleville spring 76 disposed between an outer ring 78 and the threaded disk 14 as seen in FIGS. 52–53.

Figure 50:
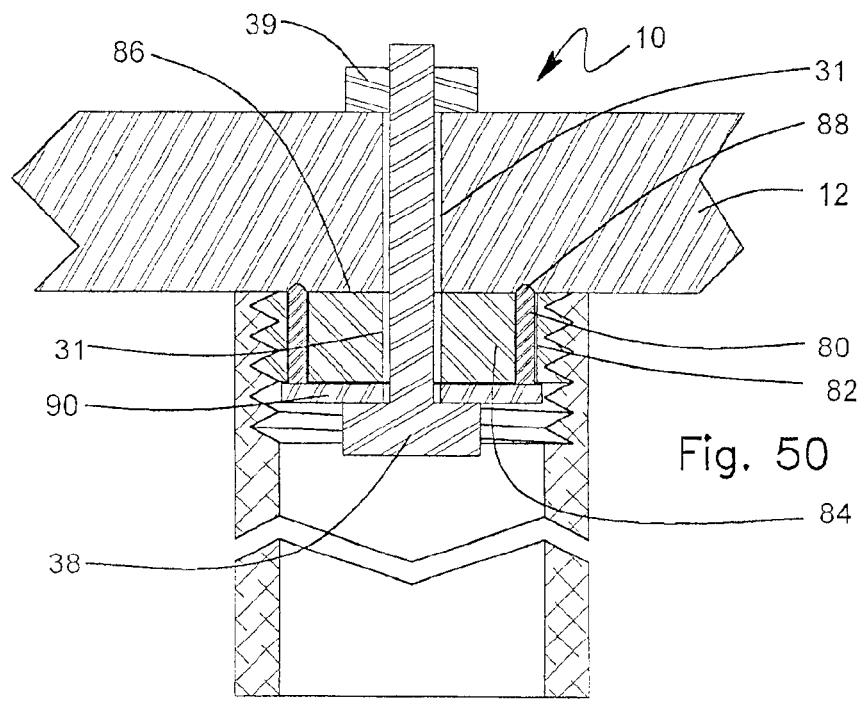
FIG. 50 shows a cross-sectional view of a variation of the joint in accordance with FIG. 39 wherein the threaded disk includes pins for inhibiting axial rotation of the disk.

A further variation of the joint 10 of the present invention is seen in FIG. 50 comprising one or more pins 80 disposed in suitable holes 82 formed in a threaded disk 84 for inhibiting rotation thereof when connected to the plate 12. In this variation, the joint 10 is made by securing the disk 84 to an engagement surface 86 and by pressing pins 80 into the engagement surface 86 by the force of tightening the attachment bolt 38 which force is transferred by a ring member 90, forming indentations 88. The disk 84 is connected to the plate 12 by bolt 38 extending through bore 31 and attached thereto by nut 39. The disk 84 includes the ring member 90 for forcing and holding the pins 80 in the indentations 88 when the threaded disk 84 is attached to the plate 12.

Figure 44:
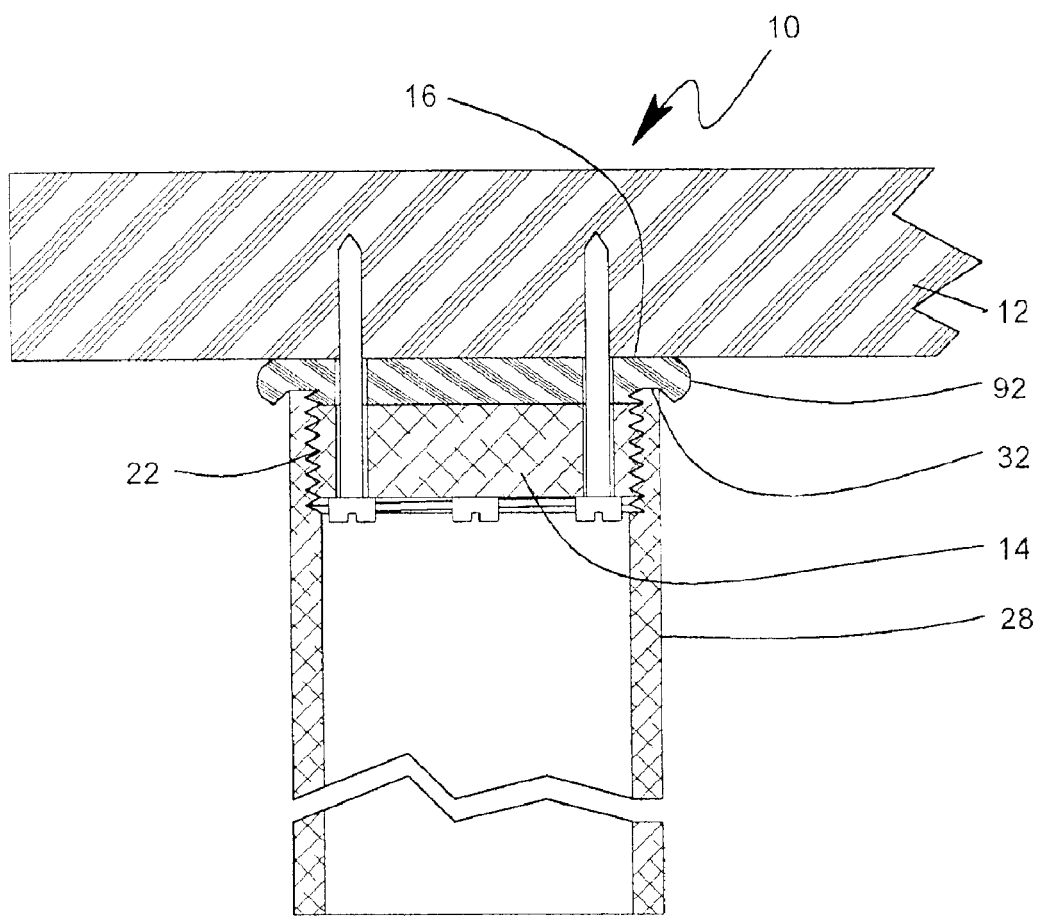
FIG. 44 shows a cross-sectional view of a variation of the joint of FIG. 2 including an elastomeric cushion between the cylinder and the plate.
Figure 45:
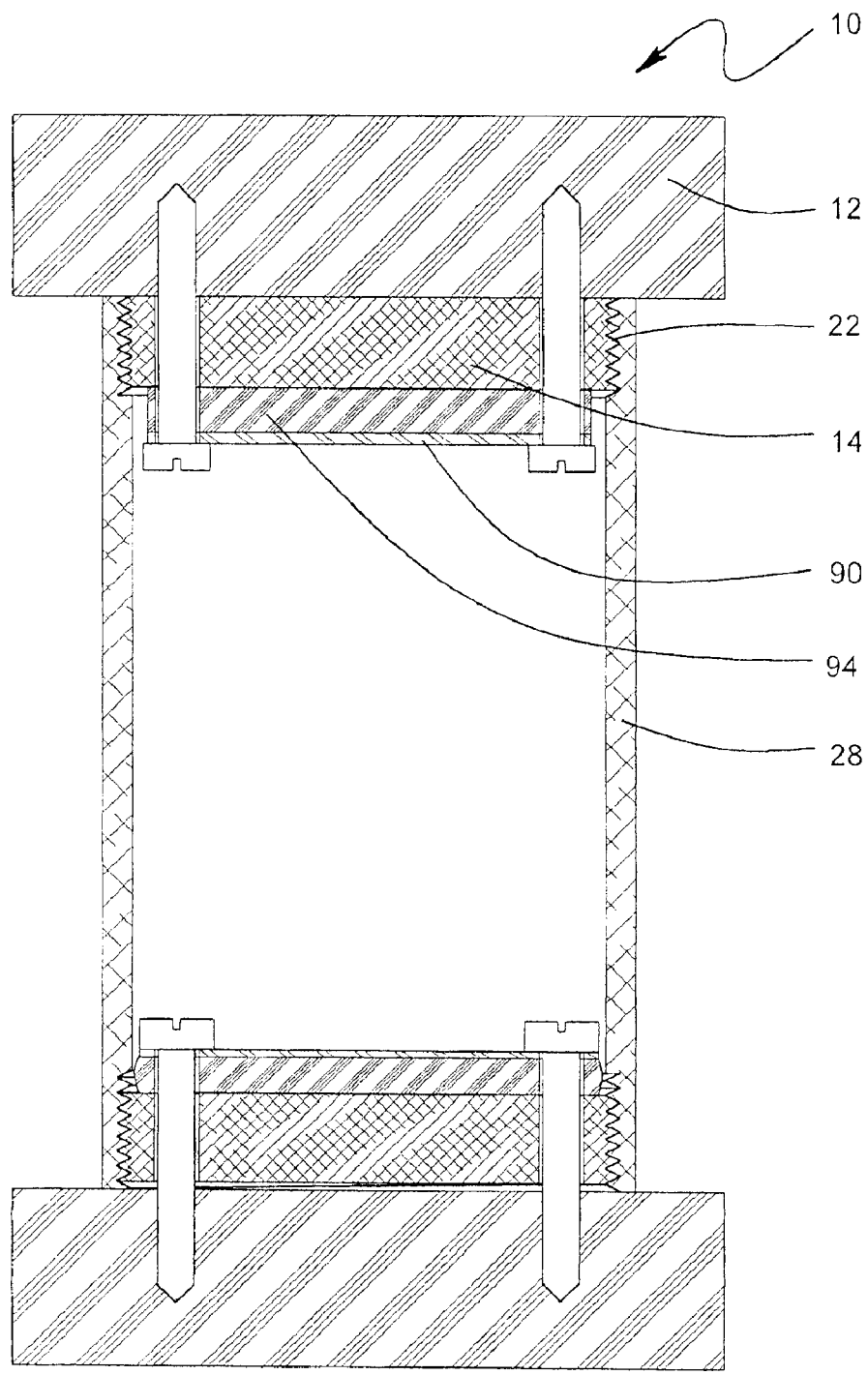
FIG. 45 shows a cross-sectional view of a variation of the joint of FIG. 43 employing an elastomeric shock absorber between the bolts and the threaded disk.
Figure 46:
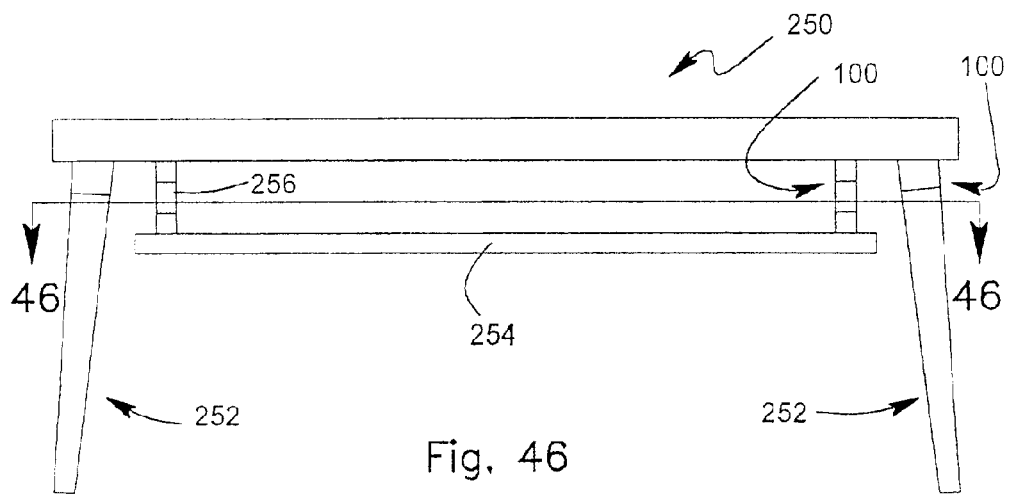
FIG. 46 shows a side view of a table having a depending shelf and legs attached using joints of the present invention as seen for example in FIG. 31 and FIG. 33.
Figure 47:
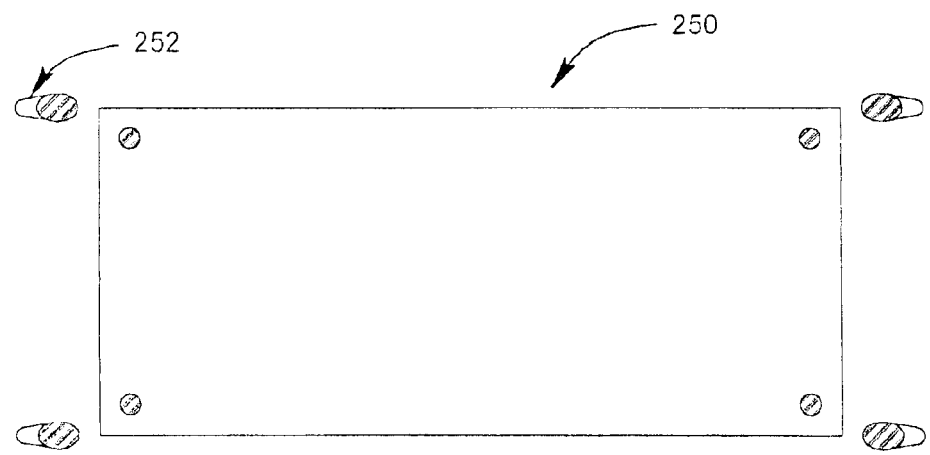
FIG. 47 shows a top cross-sectional view of the depending shelf of the Table of FIG. 46 as seen along the lines 46—46.

Yet a further variation of the joint 10 can be seen in FIGS. 44–45 including a gasket 92 disposed between the abutment surface 32 and the engagement surface 16. In FIG. 45 a shock absorbing ring 94 is disposed between the disk 14 and the ring member 90.

An embodiment 100 of the joint of the present invention can be seen in FIGS. 4–13, 17–18, 29–38, 40–42, 46–49, 51, 54–56, and 66 wherein the cylinder comprises a connecting sleeve 102 suitable for attaching an extension member 104 to the threaded disk 14. In such a manner, the joint 100 of the present invention can accommodate different shapes and sizes of extension member, such as for example a square or oval cross-section table leg or chair leg. Any means of suitably securing the extension member 104 to the sleeve 102 known in the art can be used in the practice of the present invention. Several preferred attachment means contemplated by the present invention are illustrated by the above drawings.

Referring to FIGS. 4–8, a threaded disk 106 having a central bore 108 is secured to the plate 12 by a plurality of bolts 30 as earlier described. The extension member 104 includes a radially tapered end 110 received in a radially tapered socket 112 formed in one end of the sleeve 102 and secured therein by a bolt 114 having a body 116 extending through an opening 118 of a partition 119 of the socket 112. The sleeve 102 includes threads 120 tapped into a threaded end 122 for forming a threaded connection with the disk 106 and attaching the extension member 104 to the plate 12.

As seen in FIGS. 9–10, the extension member 104 can be secured in a tapered socket 124 of a sleeve 126 by a plurality of bolts 114 (both in a circle and through the center) extending through a hub 128. The socket 124 includes a stop 130 partitioning the sleeve 126. The hub 128 includes outer threads 129 for forming a threaded connection with a threaded sleeve end 132. A similarly grouped plurality of bolts 114' attaches a threaded disk 134 to the plate 12. To form the joint 100, the threaded sleeve end 132 is attached to the threaded disk 134, securing the extension member 104 to the plate 12.

Figure 11:
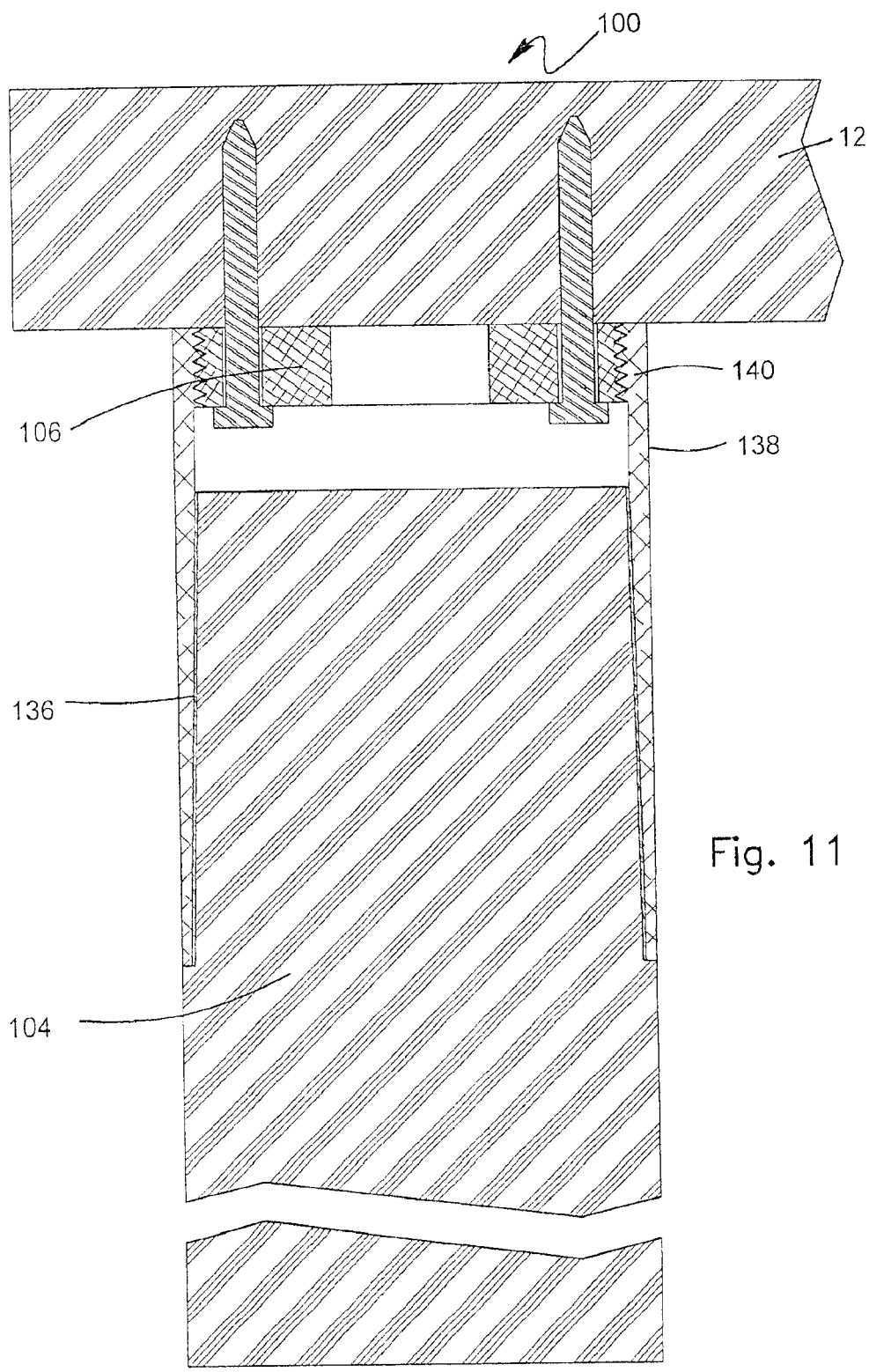
FIG. 11 shows a cross-sectional view of a variation of the embodiment of FIG. 9.
Figure 12:
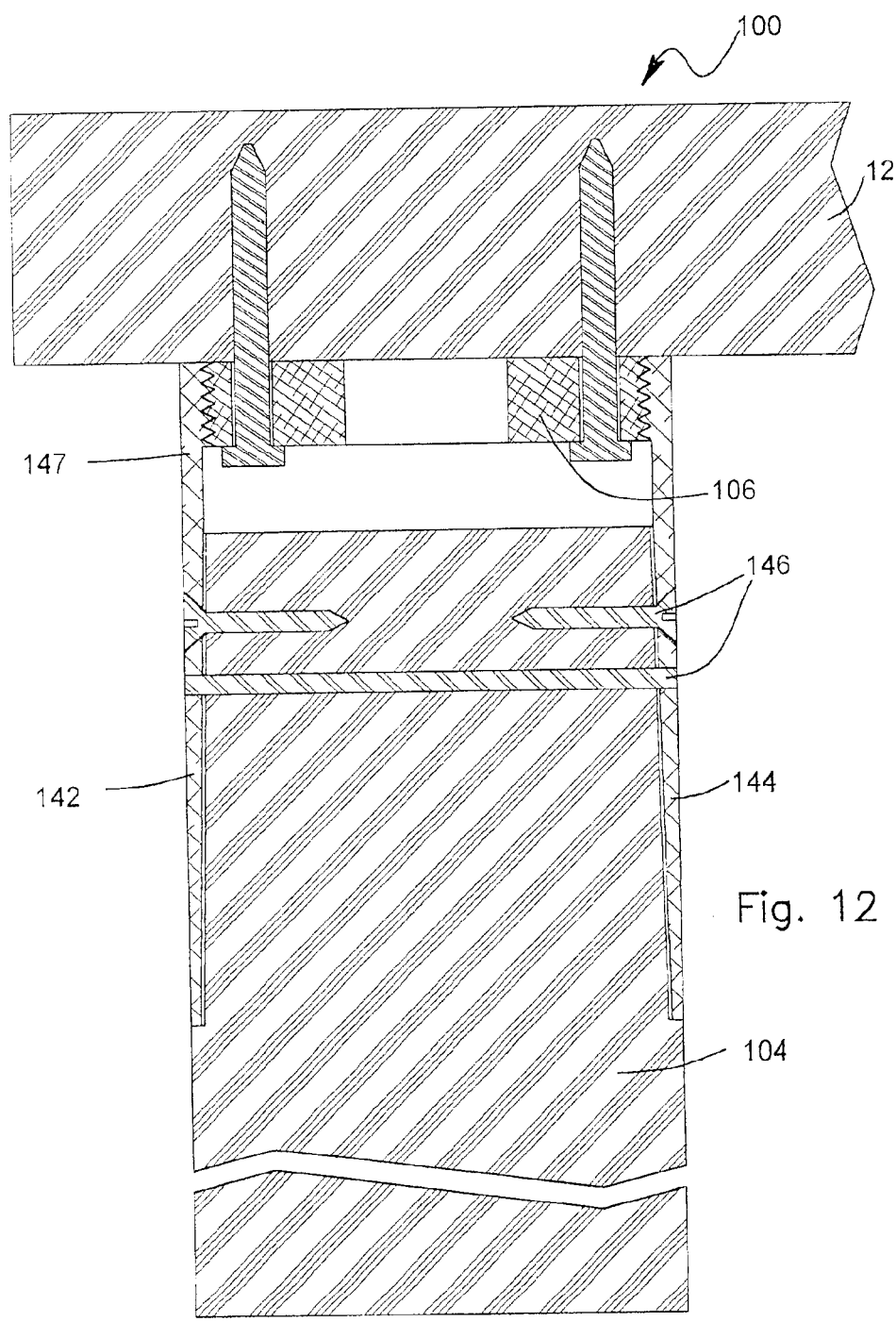
FIG. 12 shows a cross-sectional view of a variation of the embodiment of FIG. 6 including side-mounted screws.
Figure 13:
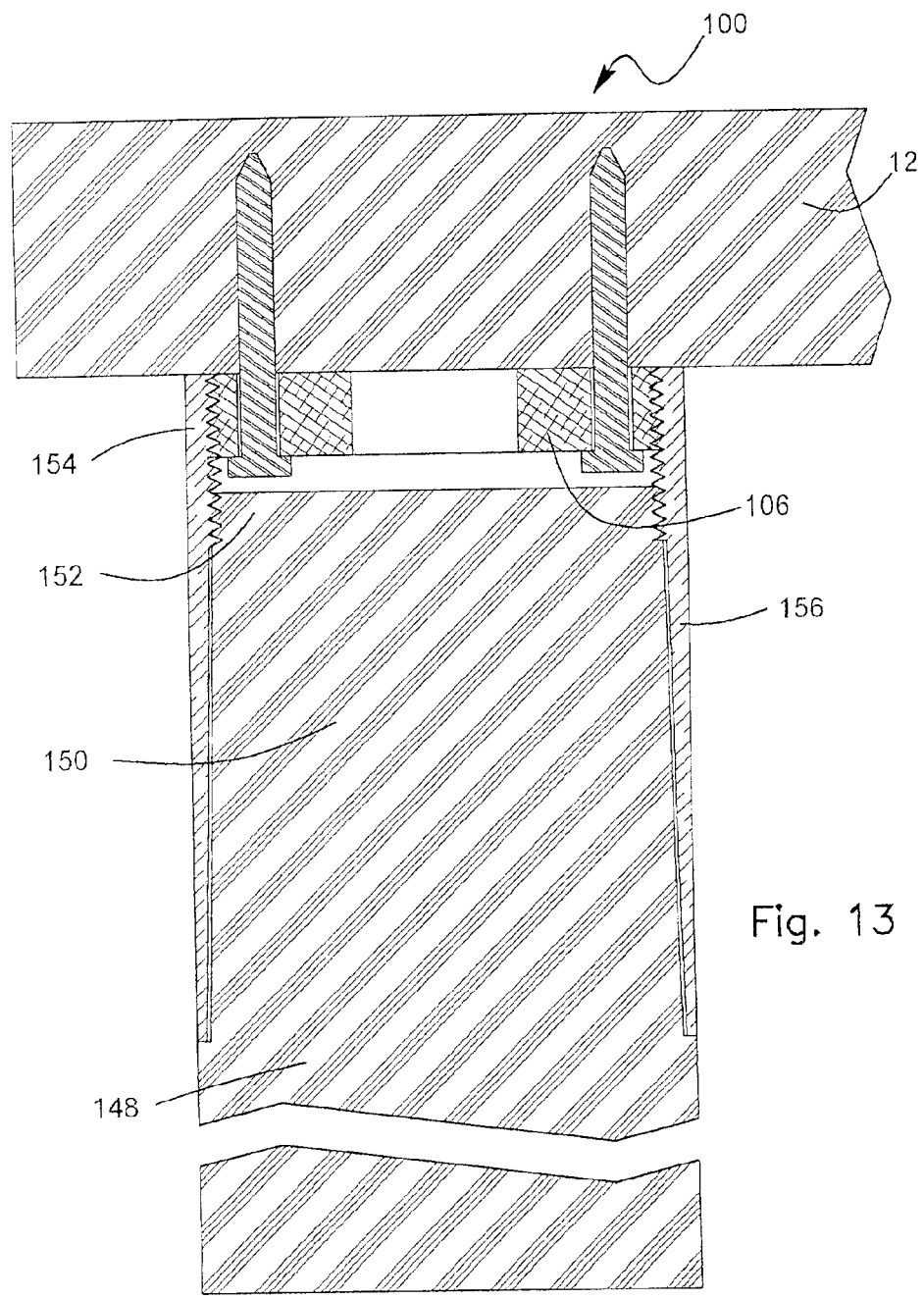
FIG. 13 shows a cross-sectional view of a variation of the embodiment of FIG. 9 including a threaded connection between the leg and the sleeve.

Variations of the joint 100 of the present invention are seen in FIGS. 11–13. In FIG. 11, the extension member 104 is secured in a tapered end 136 of a sleeve 138 by non-mechanical means such as for example, an adhesive or by a close-dimension fit in which case the extension member 104 can be pressed into the tapered end 136. A threaded end 140 is connected to the disk 106 attached to the plate 12 as earlier described. Advantage of this is to provide a one piece sleeve able to be turned from a tubular piece. In FIG. 12, the extension member 104 is secured in a tapered end 142 of a sleeve 144 by a plurality of radially disposed pins 146. A threaded end 147 is connected to the disk 106 that in turn is attached to the plate 12 as previously described. In FIG. 13, an extension member 148 includes a tapered end 150 having a threaded end 152. The threaded end 152 of the member 148 forms a threaded connection at a threaded end 154 of a sleeve 156. Once connected, the sleeve 156 is attached to the threaded disk 106 as described above for securing the extension member 148 to the plate 12.

Figure 29:
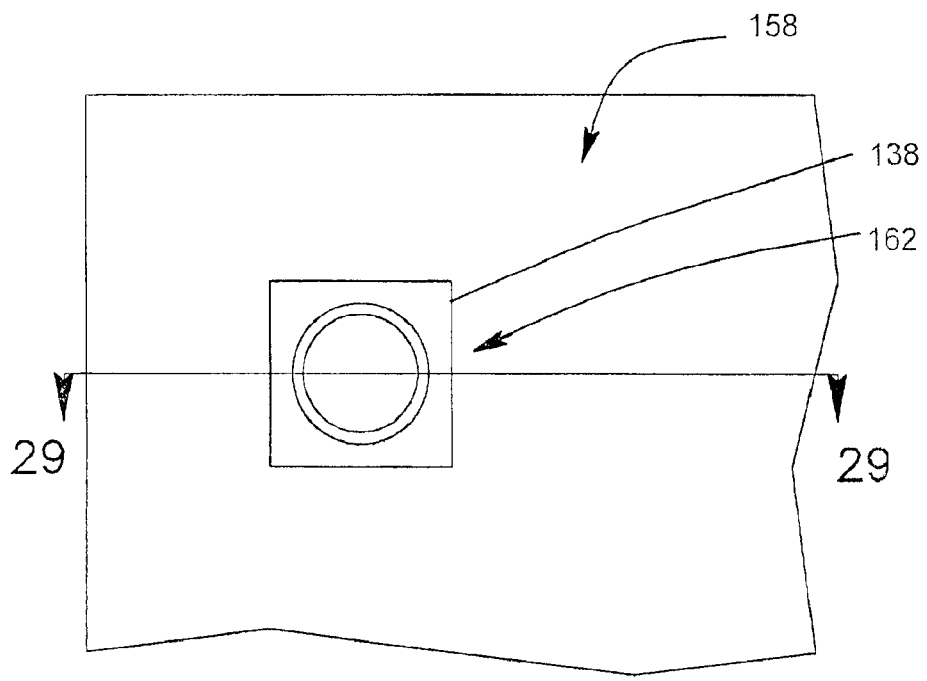
FIG. 29 shows a top view of a table having a round leg and square outer sleeve that is circular on the inside to accept a standard taper joined in accordance with FIG. 11 of the present invention for example.
Figure 30:
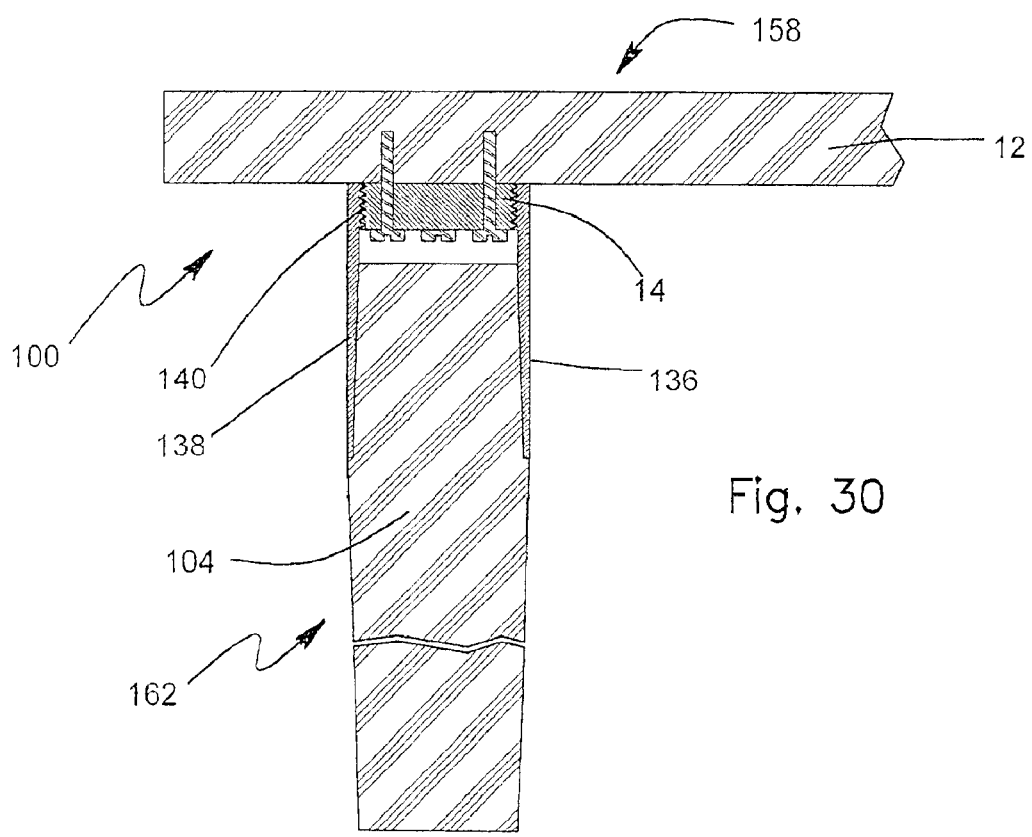
FIG. 30 shows a cross-sectional view of the table of FIG. 29 along the lines 29—29, and a possible detail view of the leg joint of the table of FIGS. 17-18.

Items of furniture such as a table 158 with an upper shelf 160 made by joints 100 of the present invention can be seen in FIGS. 17–18 and FIGS. 29–30. The table 158 has legs 162 attached, for example, using the sleeve 138 (FIG. 11) wherein the legs 162 are either pressed or glued into the sleeve tapered end 136. The threaded end 140 is attached to the threaded disk, 106 and the threaded disk, 106 is attached to the table 158 as earlier described. The shelf 160 is similarly attached using the joints 100 of the present invention. The first joint 100 attaches a cylindrical bracket 164 to the shelf 160 and a second joint 100 attaches the bracket 164 to the top of the table 158. This is an illustration of the use of a cylindrical member with right hand threads on one end and left hand threads on the other end allowing it to connect two members by simply rotating the cylinders while one end is connected to a right hand thread and the other connected end is connected to a left hand thread like a turnbuckle except the items being pulled together are pieces of furniture. As seen in FIGS. 29–30, the sleeve 138 which is square on the outside facilitates the attachment of extension members 104 having a cylindrical cross-section such as, for example, a round tapered table leg.

Figure 31:
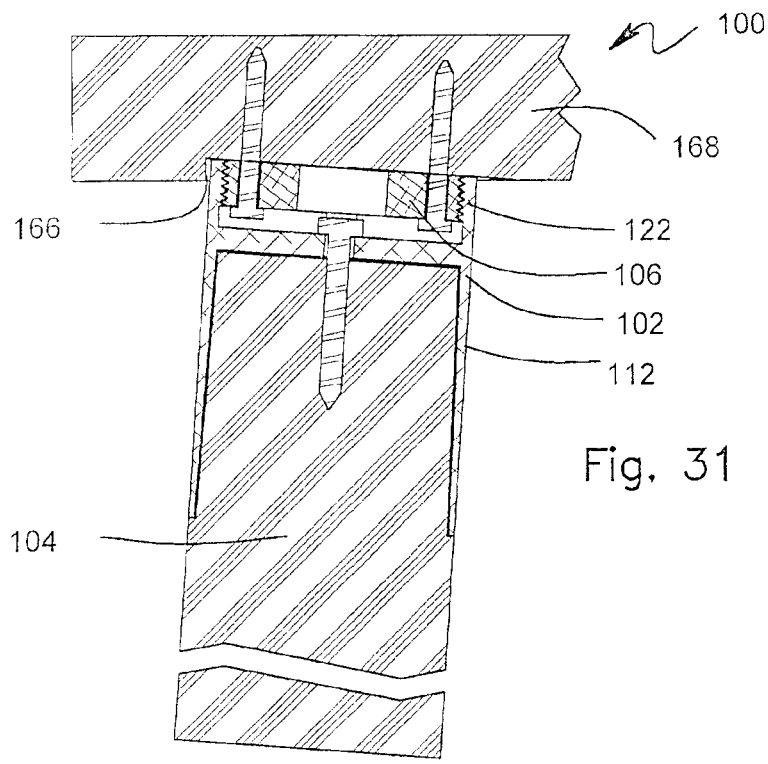
FIG. 31 shows a cross-sectional view of the joint of FIG. 6 or FIG. 9 or FIG. 11 or FIG. 12 wherein the leg is attached to the table at an angle.
Figure 32:
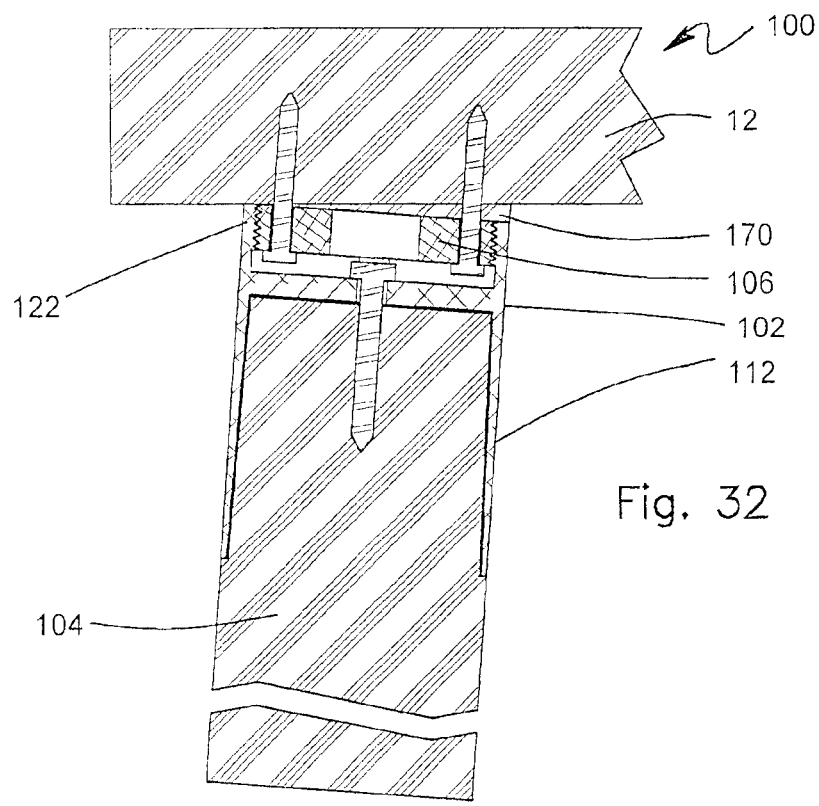
FIG. 32 shows a variation of the angled joint of FIG. 31.

Referring to FIGS. 31–32, joints 100 of the present invention attach legs to a plate at an angle to the vertical to produce additional resistance to a thrust perpendicular to the legs. As seen in FIG. 31, an indent 166 for the threaded disk 106 corresponding to the desired angle is formed in a plate 168. The sleeve tapered end 112 is bolted to the extension member 104 and the threaded end 122 is attached to the threaded disk 106 as previously described. As seen in FIG. 32, the desired angle is formed by a wedge 170 between the plate 12 and the threaded disk 106. The sleeve tapered end 112 is bolted to the extension member 104 and the threaded end 122 is attached to the threaded disk 106 as previously described.

Figure 35:
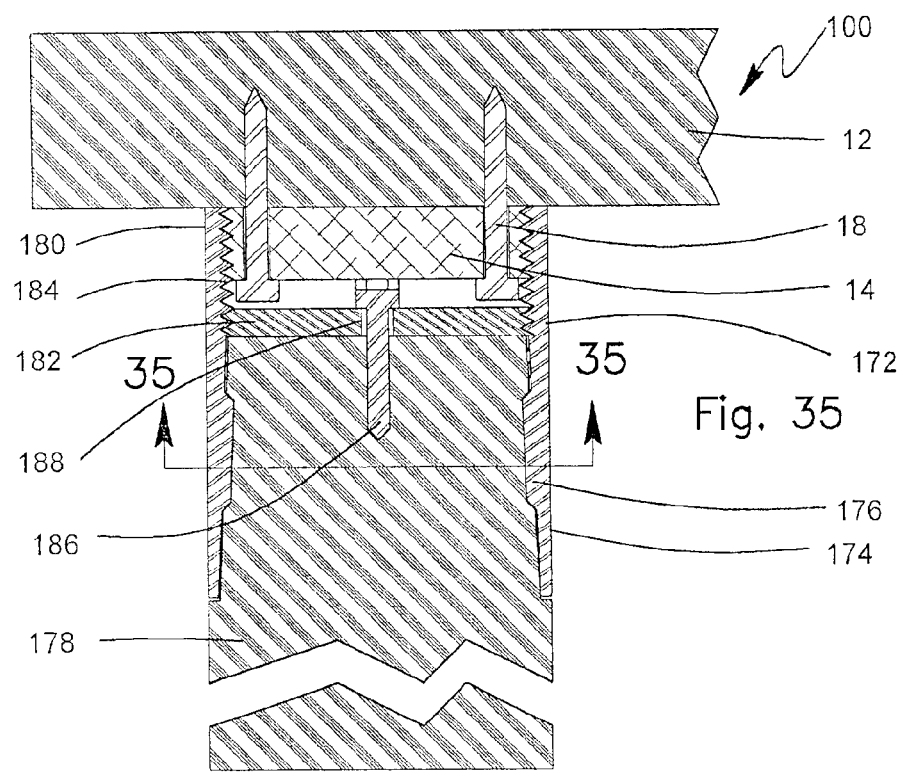
FIG. 35 shows a cross-sectional view of a variation of the joint of FIG. 6 wherein the tapered end of the sleeve includes coupling notches.
Figure 36:
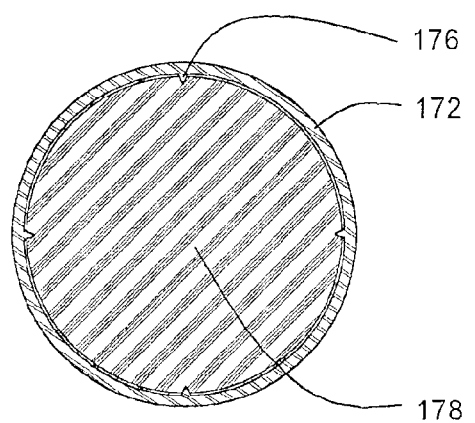
FIG. 36 shows a cross-sectional view of the notches formed in the sleeve of the joint of FIG. 35 as seen along the line 35—35.

Referring to FIGS. 35–36, a sleeve 172 includes a tapered end 174 having a plurality of axial extending stops 176 formed on the inside diameter thereof. The stops 176 are made from a harder material than the material of an extension member 178 so that inserting the extension member 178, such as a soft wood leg, into the tapered end 174 made of a metal for example, the stops 176 are embedded into the extension member 178. In such a manner, internal rotation of the extension member 178 within the sleeve 172 is inhibited. The sleeve includes a threaded end 180 for connection to the threaded disk 14 as previously described. As seen in FIG. 35, a threaded washer 182 can be used for additional support for attaching the extension member 178 to the sleeve 172. In the practice of the present invention, the threaded washer 182, typically metallic, is inserted at the sleeve threaded end 180 to the end of the threads 184. A wood or softer material extension member 178 is pressed into the metallic tapered sleeve end 174 so that an end thereof abuts the washer 182 and a bolt 186 is inserted into a bore 188. The sleeve threaded end 180 is attached to the threaded disk 14 as previously described.

Figure 33:
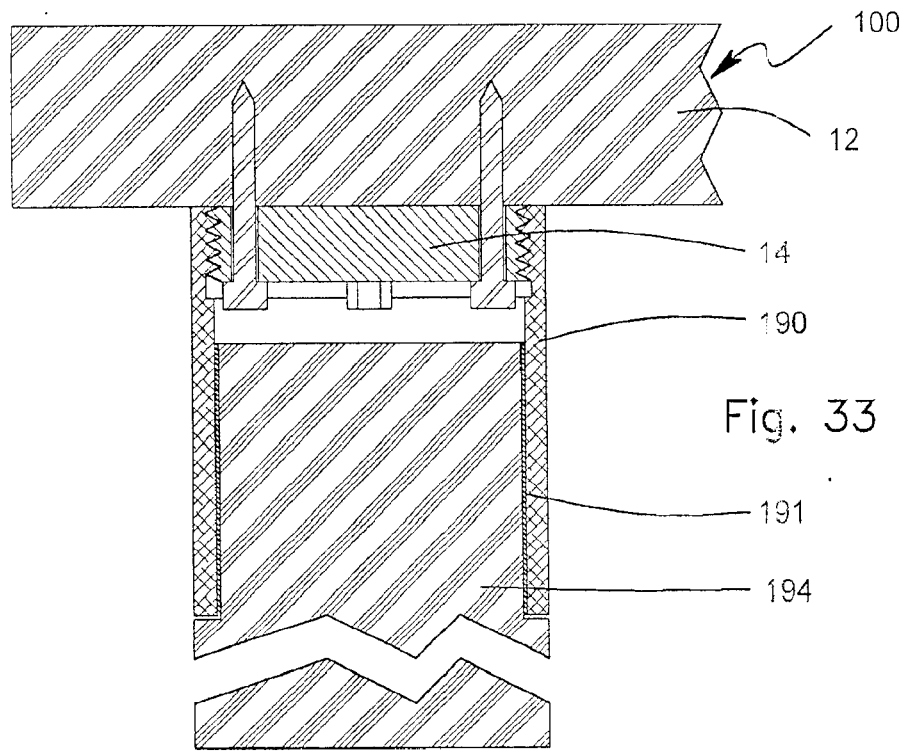
FIG. 33 shows a variation of the joint of FIG. 11, wherein the connection between the leg and the sleeve is without taper.
Figure 34:
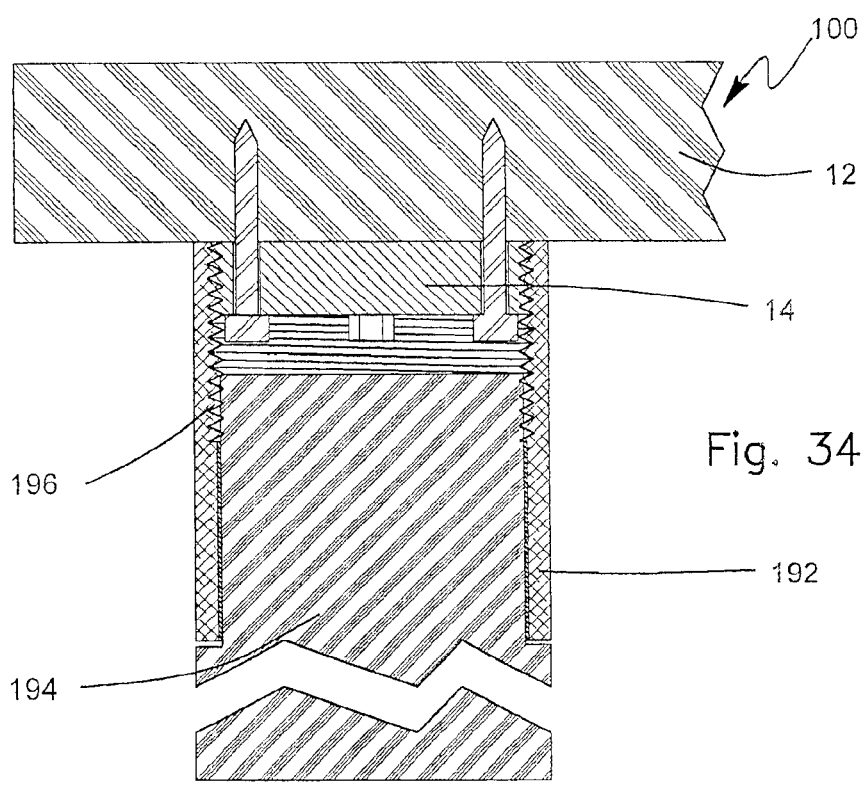
FIG. 34 shows a variation of the joint of FIG. 13, wherein the sleeve-leg connection is without taper, and is threaded.

Non-tapered sleeves, 190, 192 as seen in FIGS. 33–34, can be used to form the joint 100 of the present invention preferably when an extension member 194 is made from wood. Attachment to the wood extension member 194 can be formed by adhesive 191 or by interlocking threads 196.

As seen in FIG. 37, a joint 100 of the present invention can be implemented by employing a sleeve 198 having a plurality of axial slots 200 formed around the diameter thereof to impart compressibility to a lower end 202. A cylindrical end 203 of an extension member 205 is inserted into the lower end 202 and a clamp 204 is tightened to compress the sleeve lower end 202 and affix the extension member 205 therein.

Figure 40:
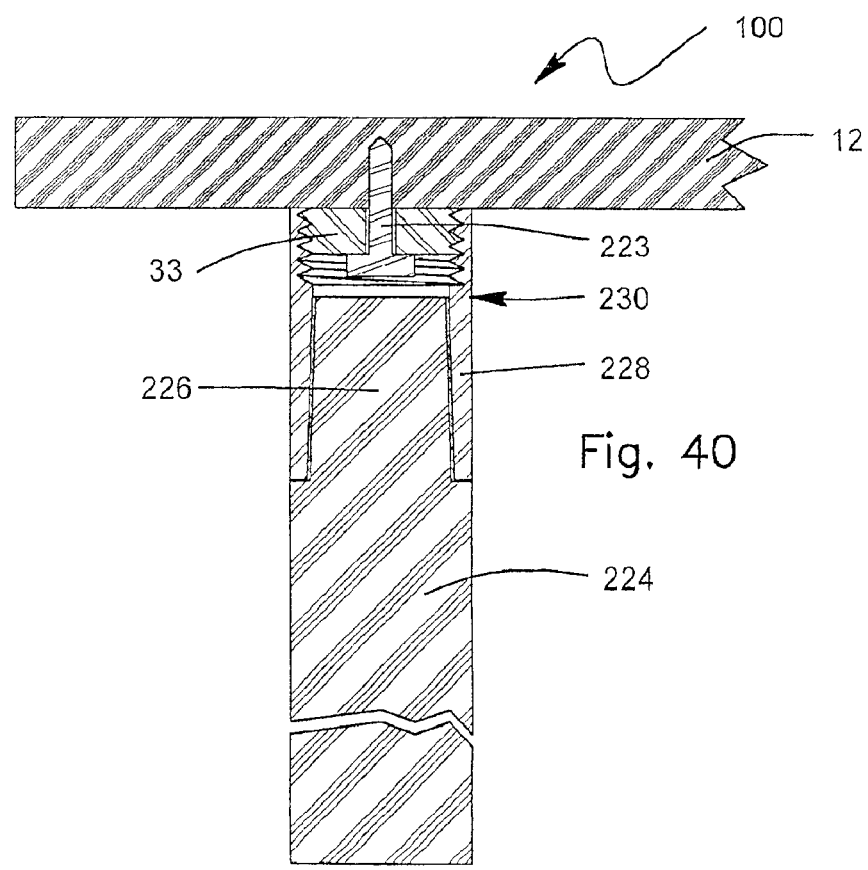
FIG. 40 shows a cross-sectional view of a variation of the joint of FIG. 33.
Figure 41:
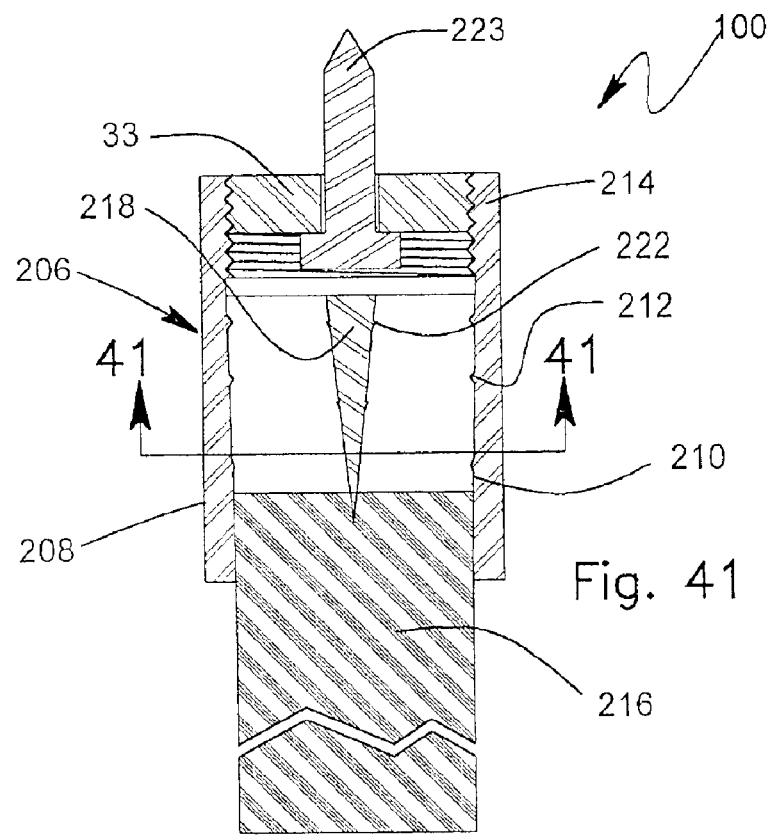
FIG. 41 shows a cross-sectional view of a further embodiment of the joint of the present invention wherein the leg is wedged into the sleeve.
Figure 42:
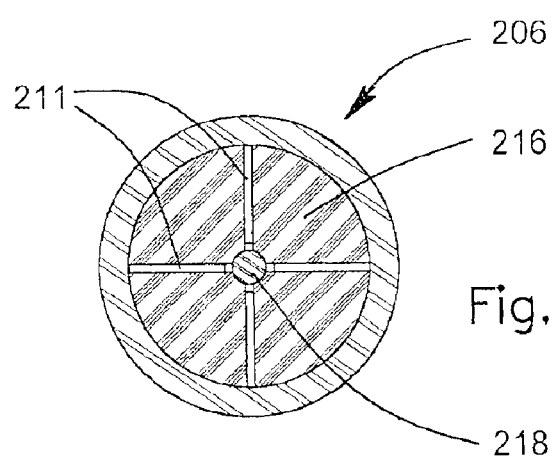
FIG. 42 shows a cross-sectional view of the joint of FIG. 41 along the lines 41—41.

Referring to FIGS. 41–42, a joint 100 of the present invention can be made using a sleeve 206 comprising a lower end 208 with a reverse tapered inside diameter 210 having a plurality of axially placed ridges 212 formed thereon and a threaded upper end 214 as described previously. In the practice of the present invention, a relatively soft extension member 216 such as fiberglass is inserted into the reverse taper sleeve end 208 and a wedge 218 comprising surface barbs 222 is inserted into an opening formed in the extension member 216 so that an outer diameter thereof is expanded and compressed onto the sleeve reverse taper end 210 and affixed thereto. Expansion is facilitated by the use of slots, 211, perpendicular to each other. Once attached, the sleeve threaded upper end 214 is connected to the threaded disk 33. The threaded disk 33 can be bolted to the plate 12 via a bolt 223 as seen in FIG. 40. Further as seen in FIG. 40, a cylindrical extension member 224 with a tapered upper end 226 is glued or pressed into a tapered end 228 of a sleeve 230.

An additional example of furniture made using the joints 100 of the present invention can be seen in FIGS. 46–49. A table 250 has detachable legs 252 attached at an angle to the vertical as previously described and shown in FIGS. 31–32, for example. The table 250 includes an under-shelf 254. The shelf 254 is similarly attached using the joints 10 of the present invention as seen in FIG. 16. One joint attaches a cylindrical bracket 256 to the shelf 254 and the second joint attaches the bracket 256 to the bottom of the table 250. The shelf is possible because supporting braces are not needed for the legs and the lower shelf can be pulled tightly to the bottom of the table 250 by rotating only the connecting joints 100 with respect to the table 250 and the shelf 254.

Figure 48:
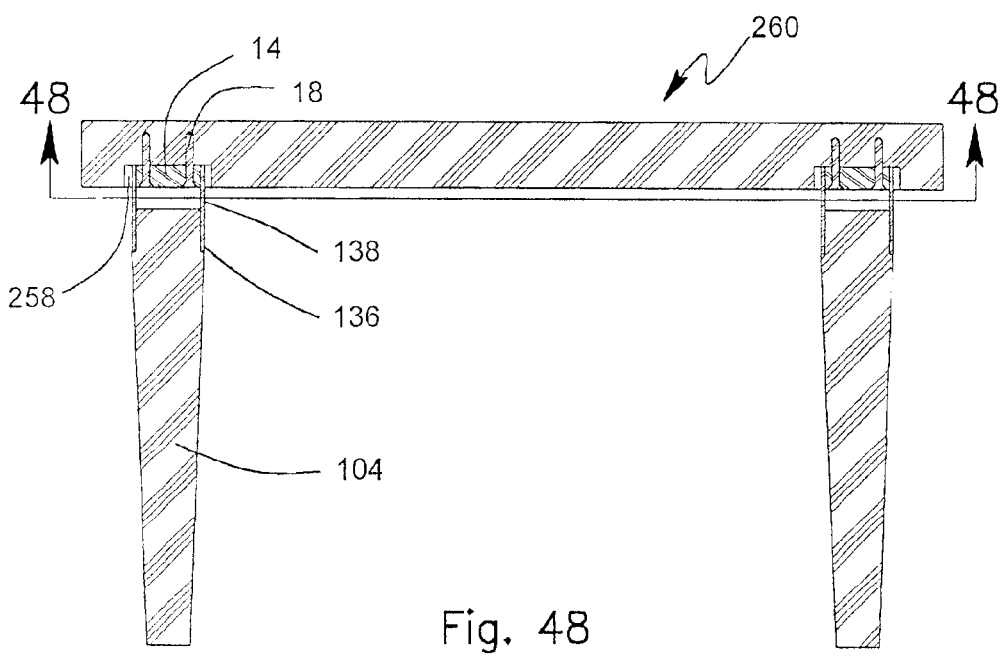
FIG. 48 shows a cross-sectional view of another table having flush mounted legs attached using joints of the present invention in accordance with FIG. 33 except for the connecting disk set in a recess in the bottom surface of the table.
Figure 49:
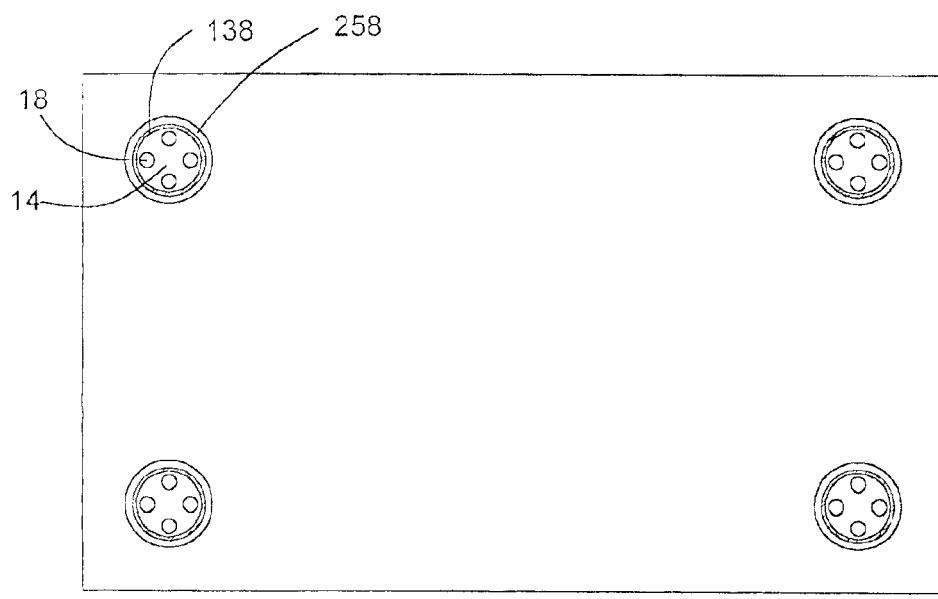
FIG. 49 shows a bottom cross-sectional view of the table of FIG. 48 as seen along the lines 48—48.

A further variation of the joint 100 of the present invention can be seen in FIGS. 48–49 wherein a plurality of recesses 258 (one for each leg) are formed on an underside of a table 260 for receiving therein the threaded disks 14 that are bolted in place by a plurality of bolts 18 as previously described. The extension member 104 (for example) comprising a table leg is secured in the sleeve lower end 136 by any suitable means. The sleeve upper end 138 is attached to the threaded disk 14 by the threads (not shown) as previously described. The reason for this design is to provide a recessed connection so when partly disassembled, there will be no protrusions on the underside of the table top from the threaded disks 14.

Figure 51:
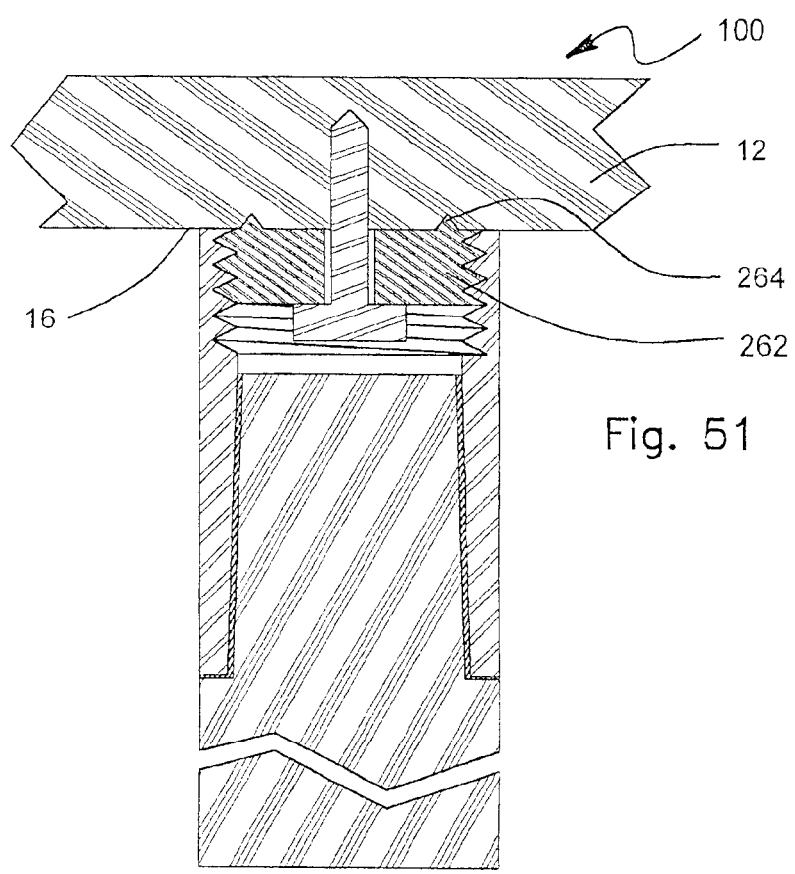
FIG. 51 shows a cross-sectional view of a variation of the joint of FIG. 40 wherein the pins shown in FIG. 50 are integrally formed on the threaded disk.

Another variation of the joint 100 of the present invention can be seen in FIG. 51 wherein a threaded disk 262 comprises a plurality of teeth 264. The disk teeth 264 engage the engagement surface 16 of the plate 12 by pressing into the surface to prevent internal rotation of the threaded disk when the sleeve threaded end is engaged therewith for attaching the extension member.

Figure 56:
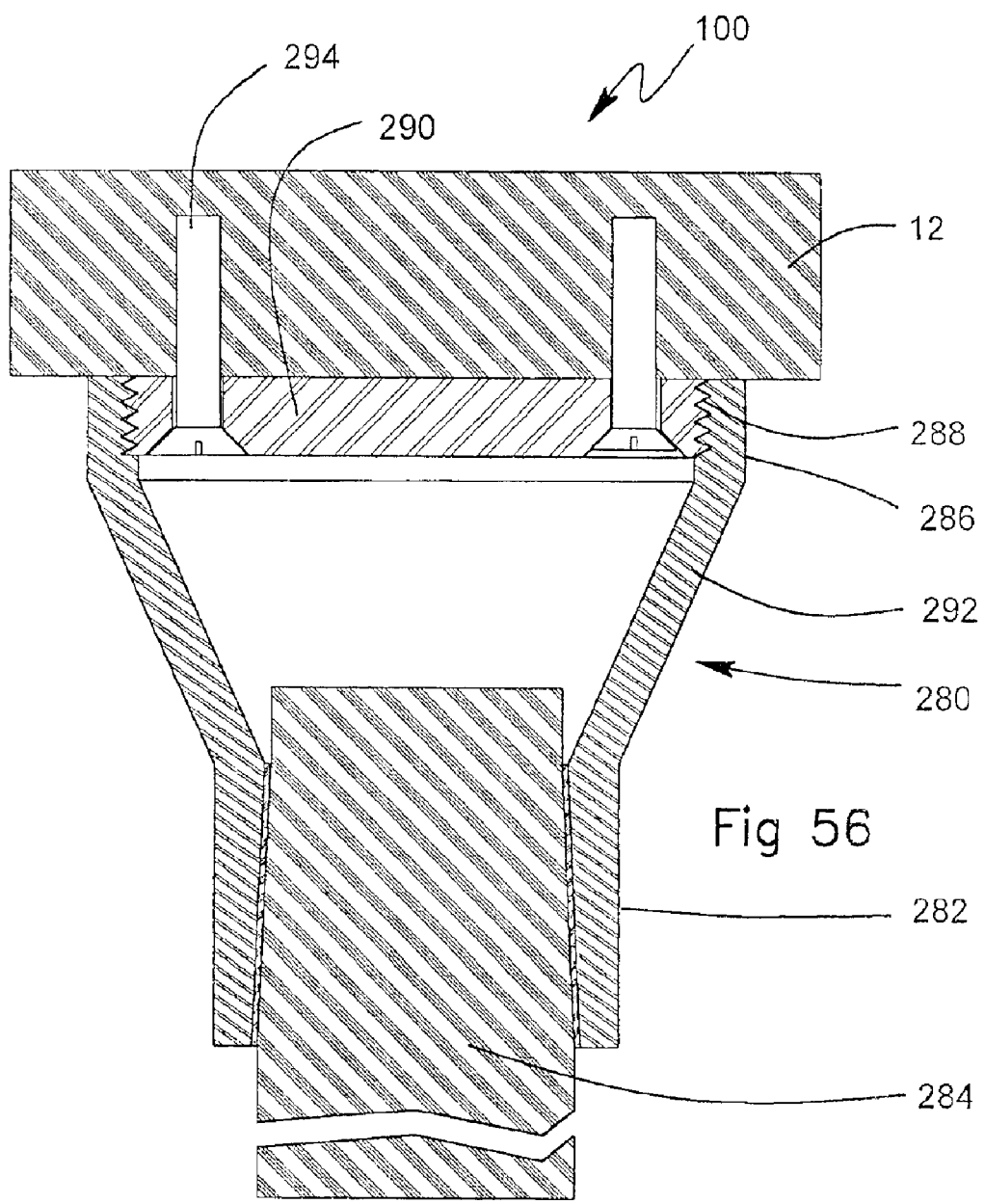
FIG. 56 shows a cross-sectional view of yet another embodiment of the joint of the present invention wherein the diameter of the cylindrical sleeve bells outwardly for enhanced strength of the joint.

A further variation of the joint 100 of the present invention can be seen in FIG. 56. A sleeve member 280 having a variable diameter comprises a smaller diameter end 282 connected to an extension member 284 by suitable means such as by welding or gluing, for example, and a larger diameter end 286 comprising a threaded connection 288 for attaching the sleeve 280 to a threaded disk 290 in the practice of the present invention. The sleeve 280 includes a diameter reducing section 292 between the larger and smaller ends 286, 282. The threaded disk 290 is attached to the plate 12 by a plurality of flathead screws 294.

Still other variations of the joint 100 of the present invention are shown in FIGS. 54–55 for making cylinder-to-plate attachments at acute angles. Referring to FIG. 54, a threaded disk 300 is integrally formed at a cylindrical end 302 of a transitional member 304 comprising a transitional end 306 of desired angle for abutting the engagement surface of a plate 308. Transverse angle screws 294 affix the transitional member 304 to a plate 310. The threaded disk 300 is joined to the cylindrical extension member 104 by the sleeve 138 (for example) as previously described. Referring to FIG. 55, an angled spacer 312 is used to affix a threaded disk 313 to a plate 314 at a desired angle. The disk 313 is attached to the plate by bolts 316 extending through the spacer 312. Typically the bolts 316 extend through the plate 314 which may be of thin gauge and be received within a housing member 318 engaging the plate at an angle complementary to the spacer 312 to complete the connection. The threaded disk 313 is joined to the extension member 104 by the sleeve 138 (for example) as previously described.

Figure 57:
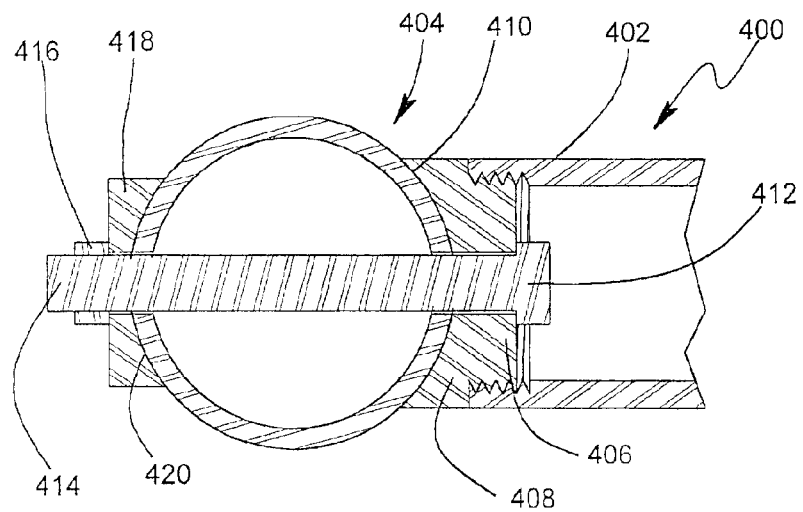
FIG. 57 shows a cross-sectional view of yet a further embodiment of the present invention wherein a joint in the manner of the present invention is made between transverse oriented cylinders using a single bolt.
Figure 58:
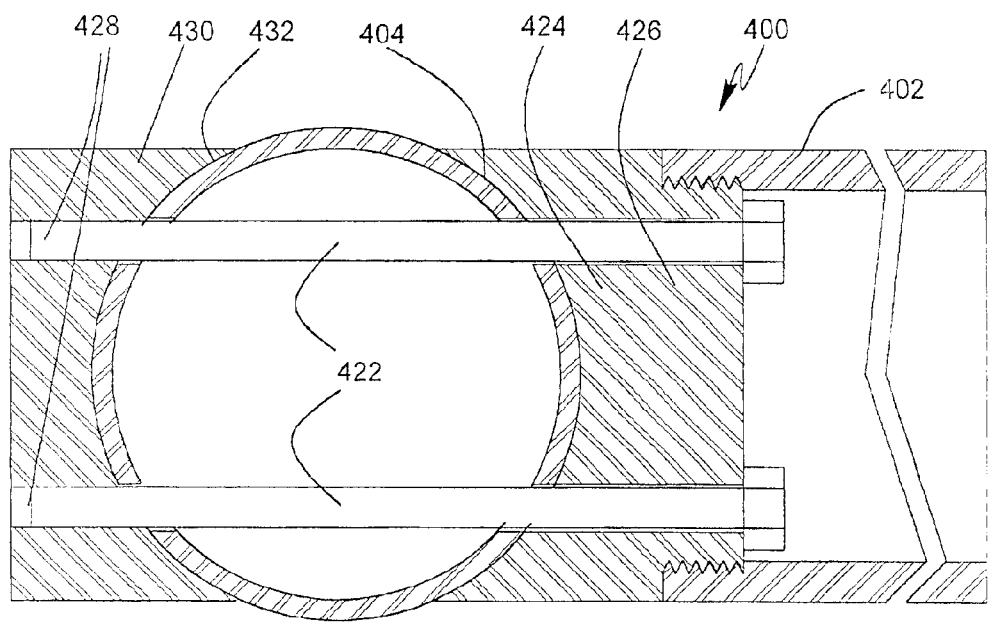
FIG. 58 shows cross-sectional view of a variation of the embodiment of the joint of FIG. 57 using a plurality of bolts.

Yet a further embodiment 400 of the joint of the present invention is illustrated in FIGS. 57–58 wherein an axial end 402 of a cylinder is joined to a non-planar surface such as, for example, a cylinder outer wall 404. Referring to FIG. 57, a threaded disk 406 is formed as an integral end of a transitional member 408 having an end surface 410 complementary to the cylinder outer wall 404 and connected thereto by a bolt 412. The bolt 412 has an end 414 received in a nut 416 having a transitional spacer 418 with a suitable surface 420 complementary to the cylinder outer wall 404. The axial cylinder end 402 is joined to the threaded disk 406 as previously described to complete the joint 400 of the present invention. Referring to FIG. 58, multiple bolts 422 are used to connect a transitional member 424 comprising threaded disk 426 to the cylinder outer wall 404. Bolts ends 428 are received within nuts integrally formed as a transitional member 430 having a surface 432 complementary to the cylinder outer wall 404. The axial cylinder end 402 is joined to the threaded disk 426 as previously described. Referring to FIG. 66, an assembly 100 similar to the one shown in FIG. 33 can be supplied with an interchangeable veneer sheath 434 to match the type of wood or other extension device 194 so that the sleeve 190 is not visible.

The joint of the present invention can be used for many purposes where strong detachable attachment of a cylindrical end to a planar surface is desired such as in the manufacture of tables, chairs, desks, shelves for furniture, and industrial support structures for machinery such as saws, presses, lathes, tools, etc. Typically, the type and details of the joints will depend on the end use of the furniture and/or support structure. Light use furniture can use joints of relatively small gauge thickness and lower strength materials ranging from wood and wood products to plastics (HDPE, polycarbonates, etc), to light weight metals such as aluminum. Heavy use supports will generally be formed of steel made from heavier gauge materials with multiple connections to ensure strength. Aesthetics of joint will also guide selection of materials and the type and number of connections used.

The foregoing description of the invention is illustrative and explanatory thereof. Various changes in the material, apparatus, and particular parts employed will occur to those skilled in the art. It is intended that all such variations within the scope and spirit of the appended claims be embraced thereby.

What is claimed is:

1. A high strength detachable cylinder-to-plate joint comprising:
   a base plate;
   a connecting disk having an exterior threaded surface and two or more holes within the radial body of the disk extending completely through the radial body for receiving attachment means for attaching the disk to the plate;
   a cylinder having an annular end; and
   a threaded connection in the interior of the annular end for detachably attaching the cylinder to the connecting disk wherein the attachment means are interiorly received by the cylinder.

2. The joint of claim 1, wherein the base plate comprises a table top and the cylinder comprises a table leg.

3. The joint of claim 1, wherein the cylinder has first and second annular ends each threadably connected to corresponding connecting disks for forming a detachable joint between first and second plates.

4. The joint of claim 3, wherein the cylinder first and second annular ends are threaded in reverse direction to each other and mate with reverse threaded plates such that connection between the two plates can be made tight by turning the cylinder in only one direction of rotation.

5. The joint of claim 1, wherein the annular end comprises a sleeve having first and second ends wherein the first end threadably receives the connecting disk and the second end receives the cylinder.

6. The joint of claim 5, wherein the second end is threadably attached to the cylinder.

7. The joint of claim 5, wherein the second end of the sleeve has tapered walls mated to a corresponding tapered diameter end of the cylinder.

8. The joint of claim 7, wherein the sleeve includes one or more attachment bolts screwed into the tapered diameter end of the cylinder.

9. The joint of claim 8, wherein the sleeve includes an integrally formed disk for receiving the attaching bolts.

10. The joint of claim 8, wherein the sleeve includes a second threadably connected disk for receiving the attaching bolts.

11. The joint of claim 1, wherein the plate is bolted between the connecting disk and a second disk having a threaded outer diameter.

12. The joint of claim 11, wherein the second disk is detachably attached to an annular end of a second cylinder to form a combination joint.

13. The joint of claim 1, wherein the connecting disk is attached by spring loaded bolts.

14. The joint of claim 1, including a gasket between the base plate and the cylinder abutment surface.

15. The joint of claim 5, wherein the sleeve has a variable diameter.

16. The joint of claim 1, including pins for limiting rotation of the connecting disk.

17. A shelving system comprising successive shelves stacked using multiple joints in accordance with claim 12.

18. Furniture comprising multiple joints in accordance with claim 3.

19. The joint of claim 5, wherein the sleeve comprises a square stock having a cylindrical hole.

20. The joint of claim 5, wherein the sleeve is enclosed by a veneer sheath comprising a material matching or complimenting the composition of the extension device in the sleeve or plate.

* * * * *